United States Patent
Ali et al.

(10) Patent No.: US 12,425,982 B2
(45) Date of Patent: Sep. 23, 2025

(54) ONBOARD SENSOR ASSISTED POWER ALLOCATION FOR RADAR AND COMMUNICATION ON MOBILE DEVICES

(71) Applicant: Samsung Electronics Co., Ltd., Suwon-si (KR)

(72) Inventors: Anum Ali, Plano, TX (US); Vutha Va, Plano, TX (US); Jianhua Mo, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 500 days.

(21) Appl. No.: 17/806,263

(22) Filed: Jun. 9, 2022

(65) Prior Publication Data
US 2023/0068765 A1 Mar. 2, 2023

Related U.S. Application Data

(60) Provisional application No. 63/237,390, filed on Aug. 26, 2021.

(51) Int. Cl.
*H04W 52/34* (2009.01)
*H04W 52/54* (2009.01)

(52) U.S. Cl.
CPC ........... *H04W 52/34* (2013.01); *H04W 52/54* (2013.01)

(58) Field of Classification Search
CPC . H04W 52/281; H04W 52/34; H04W 52/346; H04W 52/42; H04W 52/54
(Continued)

(56) References Cited

U.S. PATENT DOCUMENTS 8,386,808 B2 2/2013 Therien et al.
9,853,459 B2 * 12/2017 Park .................... H02J 7/00045
(Continued)

FOREIGN PATENT DOCUMENTS

CN 108834208 A * 11/2018
CN 109861768 A * 6/2019
(Continued)

OTHER PUBLICATIONS

International Search Report and Written Opinion issued Nov. 16, 2022 regarding International Application No. PCT/KR2022/012334, 10 pages.

*Primary Examiner* — Gennadiy Tsvey

(57) ABSTRACT

A method for allocating power of an electronic device, includes generating a power budget indicating an amount of available power for signal transmission and reception. The method also includes determining whether to prioritize communication signals or radar signals for allocating the available power of a battery. In response to a determination to prioritize the communication signals, the method includes allocating a first portion of the available power for the communication signals and a second portion of the of the available power for the radar signals. In response to a determination to prioritize the radar signals, the method includes allocating the first portion of the available power for the radar signals and the second portion of the of the available power for the communication signals. The method further includes transmitting the communication signals and the radar signals based on the allocation.

20 Claims, 13 Drawing Sheets

(58) Field of Classification Search
USPC .......................................................... 455/522
See application file for complete search history.

(56) References Cited

U.S. PATENT DOCUMENTS

| | | | | |
|---|---|---|---|---|
| 10,448,342 B1* | 10/2019 | Schwent | ................ | H04W 52/30 |
| 10,884,475 B1* | 1/2021 | Wang | ................... | G06F 1/3296 |
| 11,012,945 B2 | 5/2021 | Hasholzner et al. | | |
| 11,019,579 B2 | 5/2021 | Chen | | |
| 2003/0021245 A1 | 1/2003 | Haumonte et al. | | |
| 2010/0162006 A1* | 6/2010 | Therien | ................ | G06F 1/3203 |
| | | | | 713/300 |
| 2011/0223963 A1* | 9/2011 | Vinayak | .............. | H04W 52/226 |
| | | | | 455/522 |
| 2012/0014417 A1* | 1/2012 | Heath, Jr. | ........... | H04W 52/325 |
| | | | | 375/259 |
| 2013/0003680 A1 | 1/2013 | Yamamoto et al. | | |
| 2013/0237272 A1* | 9/2013 | Prasad | ................ | H04B 7/0617 |
| | | | | 342/372 |
| 2015/0066538 A1* | 3/2015 | Dantsker | ................ | G16H 40/63 |
| | | | | 705/2 |
| 2016/0062441 A1* | 3/2016 | Chou | ................... | G06F 1/3287 |
| | | | | 713/320 |
| 2016/0092706 A1* | 3/2016 | Deyle | ................ | G06K 19/0723 |
| | | | | 340/10.1 |
| 2016/0291676 A1 | 10/2016 | Akimoto | | |
| 2016/0330825 A1* | 11/2016 | Recker | ................... | H05B 47/16 |
| 2017/0188308 A1* | 6/2017 | Nolan | ................ | H04W 52/0235 |
| 2018/0176871 A1 | 6/2018 | Li et al. | | |
| 2018/0232032 A1* | 8/2018 | Wang | ................... | G06F 1/3234 |
| 2019/0222280 A1* | 7/2019 | Shu | ....................... | H04B 7/0874 |
| 2019/0364499 A1 | 11/2019 | Heidler et al. | | |
| 2020/0278444 A1* | 9/2020 | Va | ........................ | G06V 40/172 |
| 2020/0300996 A1 | 9/2020 | Cetinoneri et al. | | |
| 2020/0336222 A1 | 10/2020 | Rimini | | |
| 2021/0270906 A1* | 9/2021 | Chou | ................ | H02J 7/007182 |
| 2021/0399771 A1* | 12/2021 | Ahn | ...................... | H04B 7/0456 |
| 2022/0132377 A1* | 4/2022 | Santhanam | ..... | H04W 36/00692 |
| 2022/0276336 A1* | 9/2022 | Zhang | .................... | G01S 7/021 |
| 2023/0004864 A1* | 1/2023 | Wang | ..................... | G06N 20/00 |
| 2023/0012055 A1* | 1/2023 | Zhang | ................... | H01Q 1/245 |
| 2023/0041835 A1* | 2/2023 | Va | ........................ | G01S 13/522 |
| 2023/0060414 A1* | 3/2023 | Ahmed | ................ | H04W 12/03 |
| 2024/0114465 A1* | 4/2024 | Methenni | .............. | H04W 24/10 |

FOREIGN PATENT DOCUMENTS

| | | | | |
|---|---|---|---|---|
| CN | 110261848 A | * | 9/2019 | ........... G01S 13/006 |
| CN | 111050391 A | * | 4/2020 | ............. H04W 4/40 |
| CN | 111132335 A | * | 5/2020 | ............. G01S 7/02 |
| CN | 111337885 A | * | 6/2020 | ............. G01S 7/282 |
| CN | 111698786 A | | 9/2020 | |
| EP | 3522401 A1 | * | 8/2019 | ........ H04L 41/0833 |
| WO | WO-2019166429 A1 | * | 9/2019 | ........... G01S 13/003 |
| WO | 2020191070 A1 | | 9/2020 | |

* cited by examiner

Communication — 472

| Index ($i$) | $T_{put}$ Requirement | Power Requirement | |
|---|---|---|---|
| 1 | High | $R_1$ | ~472a |
| 2 | Medium | $R_2$ | ~472b |
| 3 | Low | $R_3$ | ~472c |

Radar — 474

| Index ($j$) | Application | Power Requirement | |
|---|---|---|---|
| 1 | Room Sensing | $\overline{R}_1$ | ~474a |
| 2 | Gesture Recognition | $\overline{R}_2$ | ~474b |
| 3 | MPE Detectoin | $\overline{R}_3$ | ~474c |

FIG. 4D

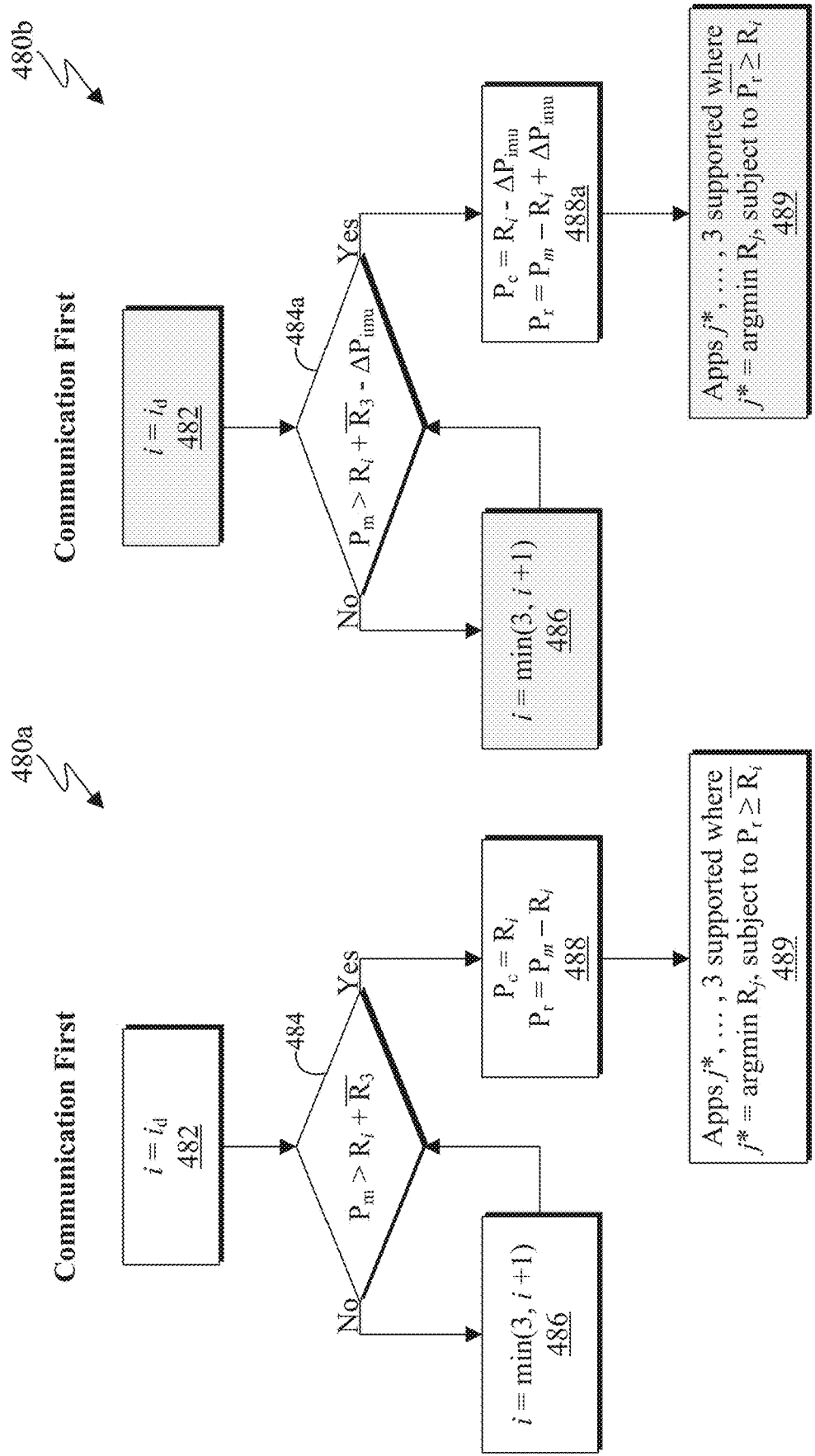

ONBOARD SENSOR ASSISTED POWER ALLOCATION FOR RADAR AND COMMUNICATION ON MOBILE DEVICES

CROSS-REFERENCE TO RELATED APPLICATION AND CLAIM OF PRIORITY

This application claims priority under 35 U.S.C. § 119(e) to U.S. Provisional Patent Application No. 63/237,390 filed on Aug. 26, 2021. The above-identified provisional patent application is hereby incorporated by reference in its entirety.

TECHNICAL FIELD

This disclosure relates generally to electronic device. More specifically, this disclosure relates to onboard sensor assisted power allocation for radar and communication on mobile.

BACKGROUND

The use of mobile computing technology such as a portable electronic device has greatly expanded largely due to usability, convenience, computing power, and the like. One result of the recent technological development is that electronic devices are becoming more compact, while the number of functions and features that a given device can perform is increasing. For example, certain electronic devices not only provide wireless communication using a mobile communication network but can also offer radar capabilities. Wireless communication using a mobile communication network can support various functions such as voice calls, internet searches, and the like. Various applications of the electronic device can perform various radar functions such as maximum permissible exposure (MPE) management, proximity sensing, gesture recognition, liveness detection, sleep monitoring, and vital sign monitoring (breathing/heart rate detection), and the like. If the resources of the electronic device, such as power, is not allocated appropriately, the wireless communication, the radar or both may fail to operate as designed.

SUMMARY

This disclosure provides onboard sensor assisted power allocation for radar and communication on mobile.

In one embodiment, electronic device is provided. The electronic device includes a transceiver, a battery, and a processor. The transceiver is configured to transmit and receive radar signals and communication signals. The processor is operability connected to the transceiver. The processor is configured to generate a power budget indicating an amount of available power for signal transmission and reception. The processor is also configured to determine whether to prioritize the communication signals or the radar signals for allocating the available power of the battery. In response to a determination to prioritize the communication signals, the processor is configured to allocate a first portion of the available power for the communication signals and a second portion of the of the available power for the radar signals. In response to a determination to prioritize the radar signals, the processor is configured to allocate the first portion of the available power for the radar signals and the second portion of the of the available power for the communication signals. The processor is further configured to transmit, via the transceiver, the communication signals and the radar signals based on the allocation.

In another embodiment, a method is provided. The method includes generating a power budget indicating an amount of available power for signal transmission and reception. The method also includes determining whether to prioritize communication signals or radar signals for allocating the available power of a battery. In response to a determination to prioritize the communication signals, the method includes allocating a first portion of the available power for the communication signals and a second portion of the of the available power for the radar signals. In response to a determination to prioritize the radar signals, the method includes allocating the first portion of the available power for the radar signals and the second portion of the of the available power for the communication signals. The method further includes transmitting the communication signals and the radar signals based on the allocation.

In yet another embodiment a non-transitory computer-readable medium embodying a computer program, the computer program comprising computer readable program code that, when executed by a processor of an electronic device, causes the processor to: generate a power budget indicating an amount of available power for signal transmission and reception; determine whether to prioritize communication signals or radar signals for allocating the available power of a battery; in response to a determination to prioritize the communication signals, allocate a first portion of the available power for the communication signals and a second portion of the of the available power for the radar signals; in response to a determination to prioritize the radar signals, allocate the first portion of the available power for the radar signals and the second portion of the of the available power for the communication signals; and transmit the communication signals and the radar signals based on the allocation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4D illustrates example power usage tables for radar and communication according to embodiments of this disclosure;

FIG. 4E illustrates an example method for allocating power when communication is prioritized according to embodiments of this disclosure;

FIG. 4F illustrates an example method for allocating power based on motion when communication is prioritized according to embodiments of this disclosure;

DETAILED DESCRIPTION

Figure 1:
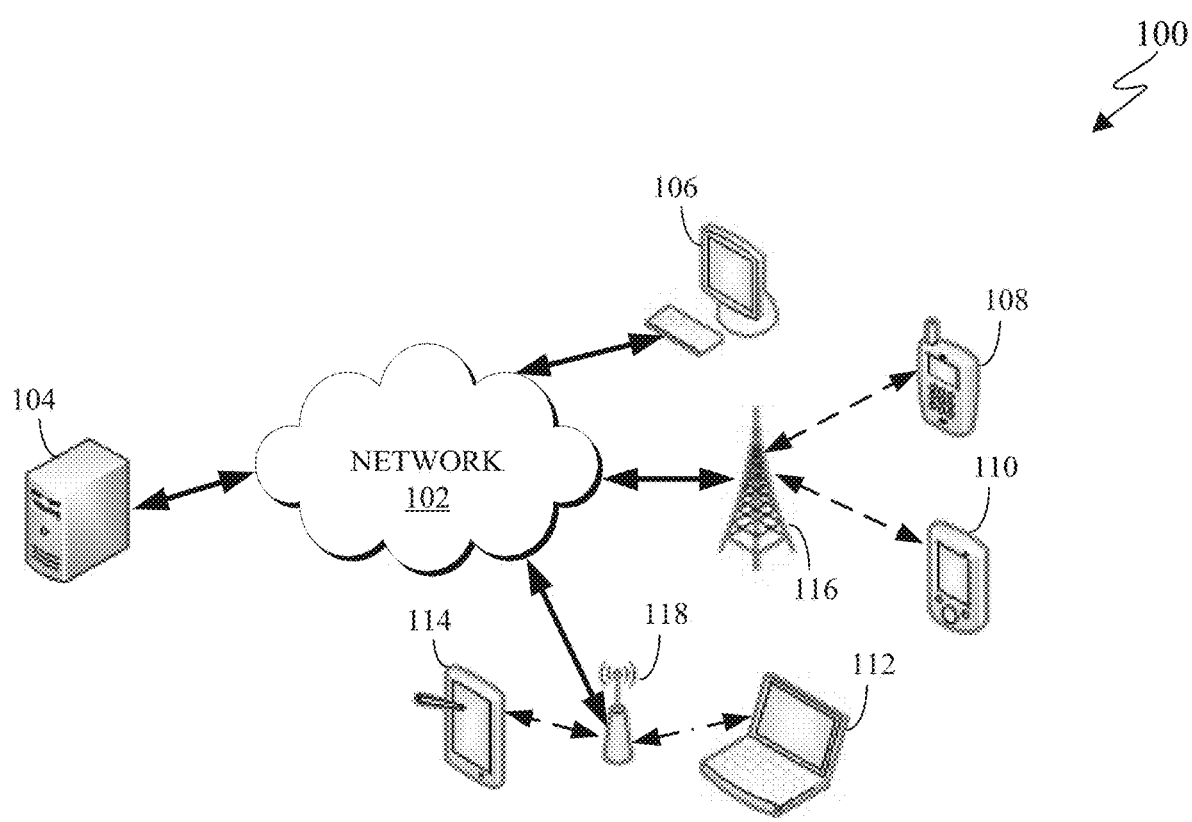
FIG. 1 illustrates an example communication system in accordance with an embodiment of this disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

To meet the demand for wireless data traffic having increased since deployment of the fourth generation (4G) communication systems, efforts have been made to develop and deploy an improved 5th generation (5G) or pre-5G or new radio (NR) communication system. Therefore, the 5G or pre-5G communication system is also called a "beyond 4G network" or a "post long-term evolution (LTE) system."

The 5G communication system is considered to be implemented in higher frequency (such as millimeter wave (mmWave)) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beamforming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

An electronic device, according to embodiments of the present disclosure can include a user equipment (UE) such as a 5G terminal. The electronic device can also refer to any component such as mobile station, subscriber station, remote terminal, wireless terminal, receive point, vehicle, or user device. The electronic device could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. Additionally, the electronic device can include a personal computer (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), a portable multimedia player (PMP), an MP3 player, a mobile medical device, a virtual reality headset, a portable game console, a camera, and a wearable device, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device.

Figure 3A:
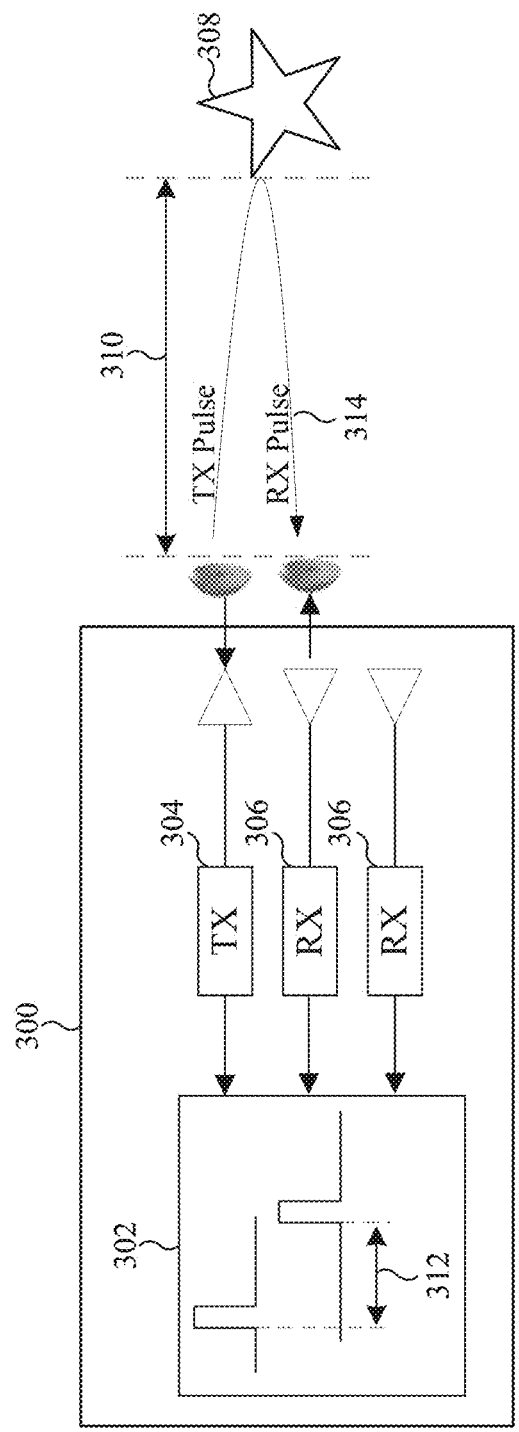
FIG. 3A illustrates an example architecture of a monostatic radar signal according to embodiments of this disclosure.
Figure 3C:
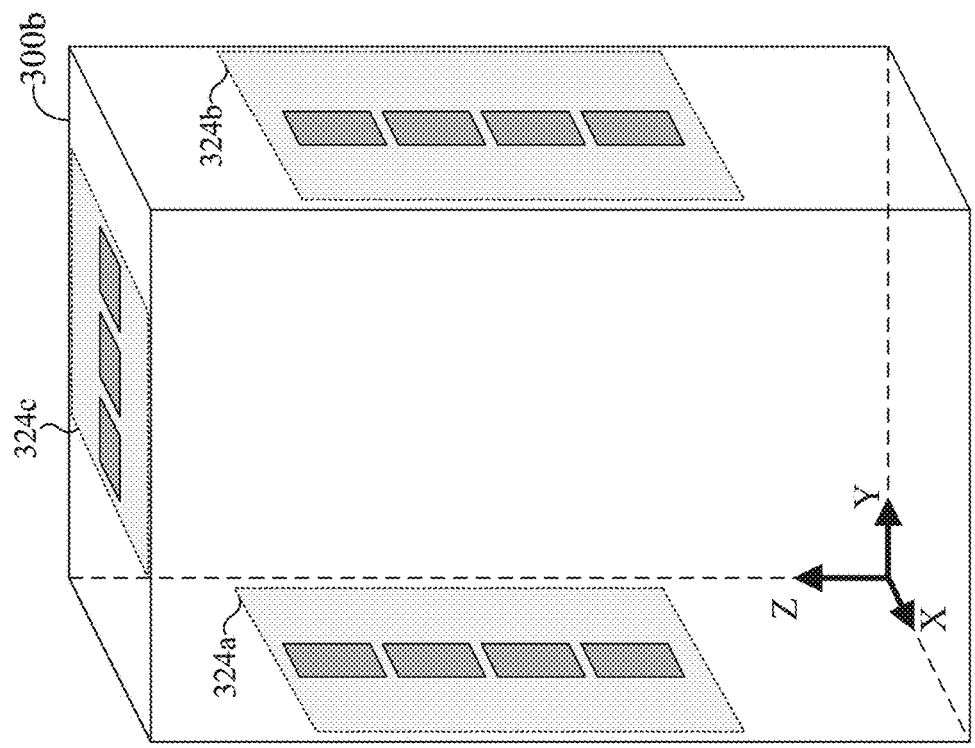
FIGS. 3B and 3C illustrate diagrams of an electronic device with radar and communication capabilities according to embodiments of this disclosure.
Figure 3B:
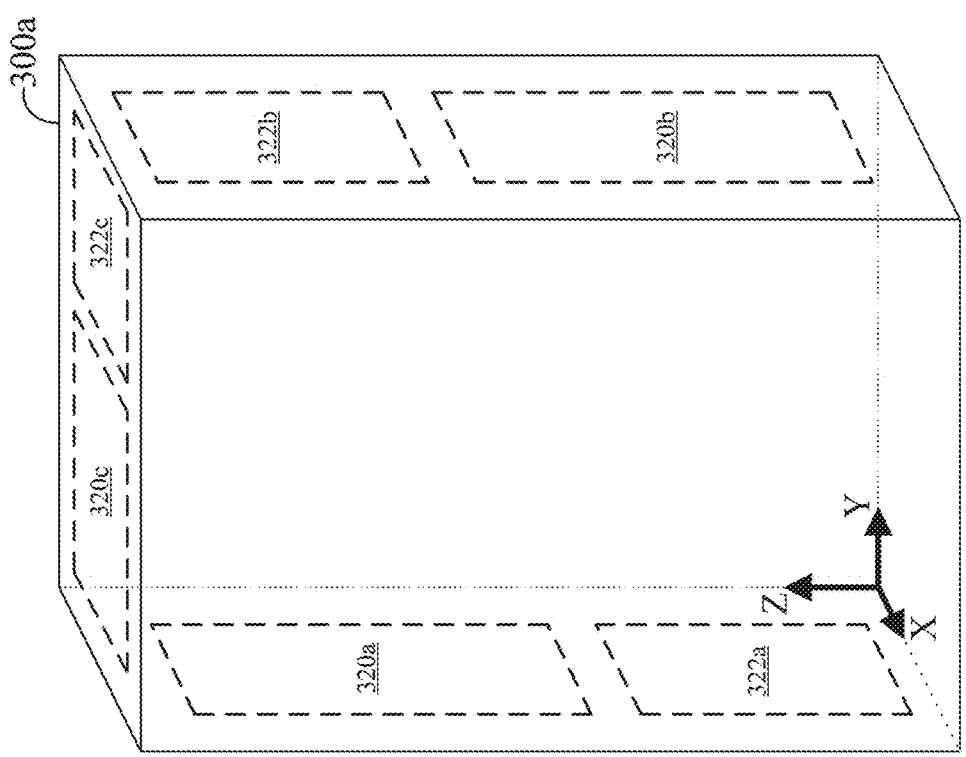

Beamforming is an important factor when an electronic device (such as a UE) tries to establish a connection with a base station (BS). To compensate for the increasing path loss at high frequencies, analog beams sweeping can be employed to support narrow beams that enable wider signal reception or transmission coverage for the UE. A beam codebook comprises a set of codewords, where a codeword is a set of analog phase shift values, or a set of amplitude plus phase shift values, applied to the antenna elements, in order to form an analog beam. FIGS. 3B and 3C, described below, illustrates a UE equipped with mmWave antenna modules or panels. A beam management procedure is implemented at the UE to maintain the best antenna module as well as the corresponding best beam of the antenna module for signal reception and transmission by the UE. The UE may also use multiple antenna modules simultaneously, in which case the beam management procedure can determine the best beam of each antenna module for signal reception and transmission by the UE.

Embodiments of the present disclosure take into consideration that beamforming is a used for reliable mmWave communications but at the same time beamforming also can cause a concern for radio frequency exposure on human body, beyond various governmental regulations. Beamforming is typically used at both the infrastructure or network side (such as at the base station or the access point) and the UE side. The process of beamforming is to adjust the antenna weights such that the transmission energy is concentrated in some direction. This focus of energy can help provide strong link signal for communications, but at the same time this means more radiation in a particular direction, which could create concern as to the exposure to human body. Due to such health concern, regulatory bodies (such as the Federal Communications Commission (FCC) in the United States of America) have sets of regulations and guidance governing such exposure. Exposure includes both exposure at low frequency (<6 GHz) and exposure at high frequency (>6 GHz). Power density (PD) is used as the exposure metric at high frequency.

Exposure limit poses a challenge regarding 5G millimeter wave uplink (UL). As discussed above, narrow beams (formed by beamforming techniques) are used for 5G millimeter wave operation, however, beamforming increases the PD and, consequently, the exposure. Certain mmWave communications take a very conservative measure to meet the exposure regulations. For example, one such approach is to use low enough Equivalent Isotropically Radiated Power (EIRP) by adjusting the duty cycle and either (i) lowering the transmit (TX) power, (ii) lowering the beamforming gain, or (iii) both lower the TX power and the beamforming gain.

Embodiments of the present disclosure take into consideration that while such a conservative measure can ensure regulatory compliance, it forces the communication operations of an electronic device to operate at suboptimal link quality and thus the electronic device cannot reap the potential for high data rate services. For example, some solutions (non-sensing solutions) assume worst case exposure. Using lower power, using wider beams, or a combination thereof are examples of certain solutions that can be used to avoid exceeding the exposure limit. However, using low power or wide beams can limit UL quality in both coverage and throughput.

Accordingly, embodiments of the present disclosure relate to using radar to assess a situation by sensing the surroundings of the electronic device. By assessing the situation, the electronic device can avoid a pessimistic TX power control. For example, a smart exposure control solution can keep exposure compliance while minimizing the opportunity loss for communication beamforming operations. Radar can be used to estimate RF exposure levels on a human body for maximum permissible exposure (MPE) determination for determining whether there is an exposure risk. Upon detecting a body part, the electronic device can manage the beams for communication to maintain regulatory RF exposure compliance while operating at enhanced link quality.

In addition to MPE determination, radar sensing can be used for detecting and identifying gesture as well as room sensing using ranging, angle estimation or both. In certain embodiments, an electronic device, using radar, can assess the situation around the electronic device. For example, the electronic device using radar can also determine the layout of a room and detect objects within the room to identify its environment. Additionally, the electronic device can detect a gesture performed by the living object as a mechanism to interact with the electronic device Upon identifying a living object, the electronic device can manage the beams for communication in order to maintain regulatory RF exposure compliance while operating at enhanced link quality. For another example, an electronic device, using radar can detect the presence of an object and determine whether the object is within a field of view (FoV) of a communication interface. Then depending on radar capabilities, the electronic device can perform a communication interface level or beam level adjustment to maintain exposure compliance. A communication interface can include an antenna panel. In certain embodiments, the communication interface has a radar FoV that is the same or similar to a FoV of wireless communication. In certain embodiments, the communication interface has a radar FoV that is different than a FoV of wireless communication.

An electronic device may operate using the communication interface level for maintaining exposure compliance such as when electronic device, using radar, cannot detect the angle between the electronic device and an object. This can occur if the electronic device has only one radar antenna or does not have enough angular resolution. For maintaining exposure compliance at the communication interface level, if the radar detects the presence of body part within its FoV, the electronic device may cause the communication interface to reduce the transmit power, revert to using less directional beam, abort the transmission altogether if the exposure risk is too high, or any combination thereof.

Alternatively, if the radar has good range resolution and can estimate the angle between itself and the target, the electronic device may operate using the beam level for maintaining exposure compliance. To maintain exposure compliance at the beam level, the electronic device divides FoV into smaller FoV regions (the granularity depends on the angle resolution of the radar and expected target size). Maintaining exposure compliance at the beam level is similar to the communication interface level, with the exception that at the beam level, when a target is detected within a particular FoV region, the electronic device adjusts the transmit power for the affected beams belonging to that FoV region, instead of the entire FoV of the communication interface.

In certain embodiments, the radar and communication can avoid interference and operate simultaneously or near simultaneously if the radar and communication operate in separate frequency bands.

Embodiments of the present disclosure take into consideration, that certain resources of an electronic device are finite. As such, several resources of the electronic device can be shared between various systems such as the radar and communication systems. Example resources include: (i) time (if the operation is achieved in a time-duplex manner), (ii) frequency (if the radar and communication systems operate simultaneously), and (ii) power. For example, if the electronic device is battery operated, only a certain amount of the power from the battery can be shared for both communication and radar purposes. In this example, the higher power use by either the radar or communication may require compromise on the performance of the other. As such, embodiments of the present disclosure describe allocating the power to improve the tradeoff between the radar and communication performance.

Therefore, embodiments of the present disclosure describe determining whether to prioritize communication over radar or prioritize radar over communication. Based on the prioritization, an electronic device can allocate power to the respective systems. This is described in reference to FIG. 4A, below. In certain embodiments, the determination can be based on an obtained higher layer input. The input can come from the electronic device itself, such as a user input or another application. The input can also come from an external source, such as via an indication from an external sensor, a server, a base station, or the like.

For example, the electronic device determines whether to prioritize communication or radar based on an obtained input from higher layers. Upon a determination to prioritize either the communication or radar, the electronic device can optimize certain parameters in power allocation based on the determination (of whether communication is prioritized over radar or whether radar is prioritized over communication). When the electronic device determines that communication is prioritized over radar (also denoted as a communication-first power allocation), the electronic device can allocate power to the communication system to maximize throughput given a power budget, while allocating enough power to the radar system for certain functions such as for MPE detection. This example is described in FIG. 4E, below. When the electronic device determines that radar is prioritized over communication (also denoted as a radar-first power allocation), the electronic device can allocate power to the radar system to meet a power requirement of a radar application given a power budget, while allocating enough to the communication system for communication purposes. This example is described in FIG. 4G, below.

In certain embodiments, information from onboard sensors is used to improve the power allocation. Onboard sensors include an inertial measurement unit (IMU), a proximity sensor, a temperature sensor, and the like. For example, embodiments of the present disclosure also describe adjusting the power allocation based on a change in the orientation of the electronic device. Embodiments of the present disclosure further describe adjusting the power allocation based on whether an object is detected near the electronic device. For example, the electronic device can determine an improvement in signal quality ($\Delta P_{IMU}$) based on the orientation information. In a communication-first power allocation, the electronic device can decrease the power allocated to the communication system by $\Delta P_{IMU}$ and increase the power allocated to the radar system by $\Delta P_{IMU}$. This example is described in FIG. 4F, below. In a radar-first power allocation, the electronic device can decrease the power allocated to the communication system by $\Delta P_{IMU}$. This example is described in FIG. 4H, below.

Embodiments of the present disclosure also describe adjusting the power allocation based on whether an object is detected within a predefined distance from the electronic device. For example, when an object is detected near the electronic device, the power allocated to the radar can increase in order to support more functions, such as gesture detection in addition to MPE detection. However, when an object is not detected near the electronic device, the power allocated to the radar can be maintained at or decrease to a level for supporting MPE detection. It is noted that MPE detection uses less power than gesture detection. This is described in FIG. 5, below.

While the descriptions of the embodiments of the present disclosure describe a radar-based system for object detection and motion detection, the embodiments can be applied to any other radar based and non-radar-based recognition systems. That is, the embodiments of the present disclosure are not restricted to radar and can be applied to other types of sensors (such as an ultra-sonic sensor) that can provide both range, angle, speed measurements, or any combination thereof. It is noted that when applying the embodiments of the present disclosure using a different type of sensor (a sensor other than a radar transceiver), various components may need to be tuned accordingly.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone (such as a UE), a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100, such as wearable devices. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a measuring (or radar) transceiver.

In this example, some client devices 108-114 communicate indirectly with the network 102. For example, the mobile device 108 and PDA 110 communicate via one or more base stations 116, such as cellular base stations or eNodeBs (eNBs) or gNodeBs (gNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
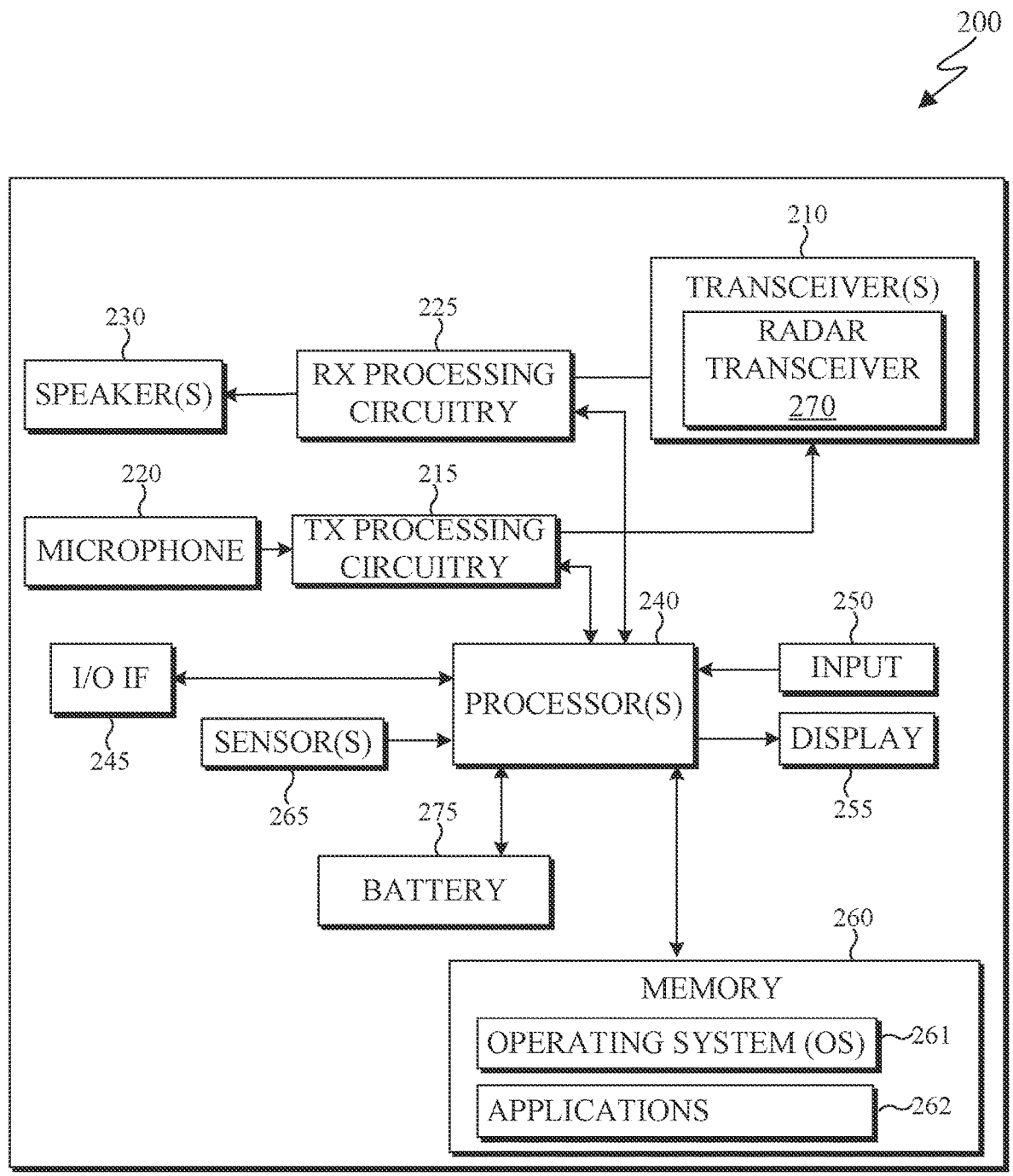
FIG. 2 illustrates an example electronic device in accordance with an embodiment of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a UE, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. For example, the transceiver(s) 210 can be equipped with multiple antenna elements. There can also be one or more antenna modules fitted on the terminal where each module can have one or more antenna elements. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processors 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, the radar transceiver 270, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active-matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more IMUs, such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

In this embodiment, one of the one or more transceivers in the transceiver 210 is a radar transceiver 270 that is configured to transmit and receive signals for detecting and ranging purposes. The radar transceiver 270 can transmit and receive signals for measuring range and speed of an object that is external to the electronic device 200. The radar transceiver 270 can also transmit and receive signals for measuring the angle a detected object relative to the electronic device 200. For example, the radar transceiver 270 can transmit one or more signals that when reflected off of a moving object and received by the radar transceiver 270 can be used for determining the range (distance between the object and the electronic device 200), the speed of the object, the angle (angle between the object and the electronic device 200), or any combination thereof.

The radar transceiver 270 may be any type of transceiver including, but not limited to a radar transceiver. The radar transceiver 270 can include a radar sensor. The radar transceiver 270 can receive the signals, which were originally transmitted from the radar transceiver 270, after the signals have bounced or reflected off of target objects in the surrounding environment of the electronic device 200. In certain embodiments, the radar transceiver 270 is a monostatic radar as the transmitter of the radar signal and the receiver, for the delayed echo, are positioned at the same or similar location. For example, the transmitter and the receiver can use the same antenna or nearly co-co-located while using separate, but adjacent antennas. Monostatic radars are assumed coherent, such as when the transmitter and receiver are synchronized via a common time reference. FIG. 3A illustrates an example monostatic radar.

The battery 275 may supply power to at least one component of the electronic device 200. According to an embodiment, the battery 275 may include, for example, a primary cell which is not rechargeable, a secondary cell which is rechargeable, or a fuel cell. In certain embodiments, the processor 240 may manage the power of the battery 275. For example, the processor 240 can manage the supply of power from the battery 275 to the different components of the electronic device 200, such as the transceiver 210, the display 255, and the like.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

Figure 3D:
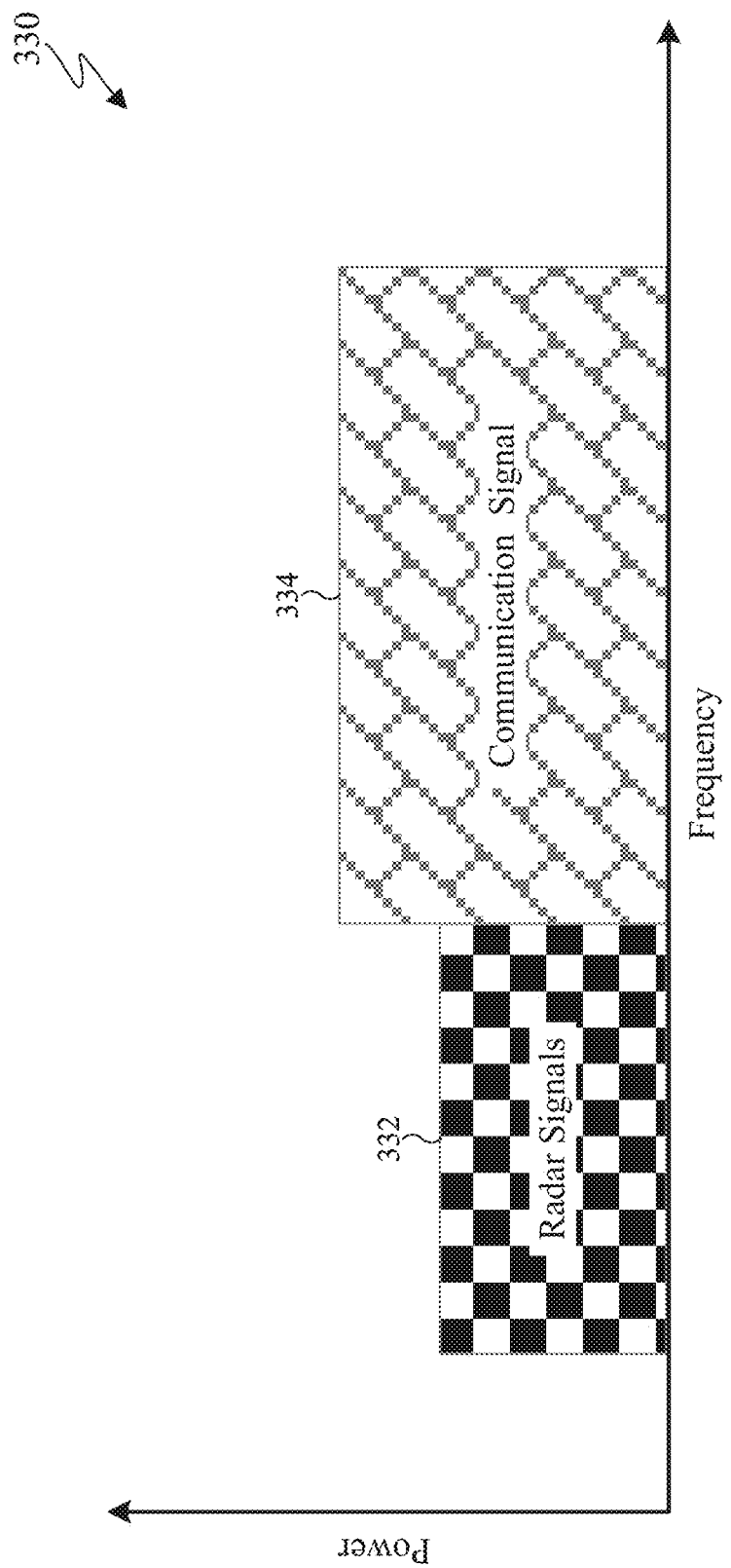
FIG. 3D illustrates an example power spectrum allocation graph according to embodiments of this disclosure.

FIG. 3A illustrates an example architecture of a radar signal according to embodiments of this disclosure. FIGS. 3B and 3C illustrate diagrams of an electronic device with radar and communication capabilities according to embodiments of this disclosure. FIG. 3D illustrates an example power spectrum allocation graph 330 according to embodiments of this disclosure. The embodiments of FIGS. 3A-3D are for illustration only and other embodiments can be used without departing from the scope of the present disclosure.

FIG. 3A illustrates an electronic device 300 that includes a processor 302, a transmitter 304, and receivers 306. The electronic device 300 can be similar to any of the client devices 106-114 of FIG. 1, the server 104 of FIG. 1, or the electronic device 200 of FIG. 2. The processor 302 is similar to the processor 240 of FIG. 2. Additionally, the transmitter 304 and the receiver 306 can be included within the radar transceiver 270 of FIG. 2.

The transmitter 304 of the electronic device 300 transmits a signal 314 to the target object 308. The target object 308 is located a distance 310 from the electronic device 300. For example, the transmitter 304 transmits a signal 314 via an antenna. In certain embodiments, the target object 308 corresponds to a human body part (for MPE detection or gesture detection operations) or objects within an environment around the electronic device (such as for room sensing operations). The signal 314 is reflected off of the target object 308 and received by the receiver 306, via an antenna. The signal 314 represents one or many signals that can be transmitted from the transmitter 304 and reflected off of the target object 308. The processor 302 can identify the information associated with the target object 308, such as the speed the target object 308 is moving and the distance the target object 308 is from the electronic device 300, based on the receiver 306 receiving the multiple reflections of the signals, over a period of time.

Leakage (not shown) represents radar signals that are transmitted from the antenna associated with transmitter 304 and are directly received by the antenna associated with the receiver 306 without being reflected off of the target object 308.

For object detection, the processor 302 analyzes a time difference 312 from when the signal 314 is transmitted by the transmitter 304 and received by the receiver 306. It is noted that the time difference 312 is also referred to as a delay, as it indicates a delay between the transmitter 304 transmitting the signal 314 and the receiver 306 receiving the signal after the signal is reflected or bounced off of the target object 308. Based on the time difference 312, the processor 302 derives the distance 310 between the electronic device 300, and the target object 308. Additionally, based on multiple time differences 312 and changes in the distance 310, the processor 302 can derive the speed that the target object 308 is moving.

Monostatic radar is characterized for its delayed echo as the transmitter 304 of the radar signal and the receiver 306 of the radar signal essentially are at the same location. In certain embodiments, the transmitter 304 and the receiver 306 are co-located either by using a common antenna or nearly co-located but use separate but adjacent antennas. Monostatic radars are assumed coherent such that the transmitter 304 and the receiver 306 are synchronized via a common time reference.

A radar pulse is generated as a realization of a desired radar waveform, modulated onto a radio carrier frequency, and transmitted through a power amplifier and antenna, such as a parabolic antenna. In certain embodiments, the pulse radar is omnidirectional. In other embodiments, the pulse radar is focused into a particular direction. When the target object 308 is within the field of view of the transmitted signal and within a distance 310 from the radar location, then the target object 308 will be illuminated by RF power density (W/m$^2$), $p_t$, for the duration of the transmission. Equation (1) describes the first order of the power density, $p_t$.

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2} \quad (1)$$

Referring to Equation (1), $P_T$ is the transmit power (W). $G_T$ describes the transmit antenna gain (dBi) and $A_T$ is an effective aperture area (m$^2$). λ corresponds to the wavelength of the radar signal (m), and R corresponds to the distance 310 between the antenna and the target object 308. In certain embodiments, effects of atmospheric attenuation, multi-path propagation, antenna loss and the like are negligible, and therefore not addressed in Equation (1).

The transmit power density impinging onto the target object 308 surface can cause reflections depending on the material, composition, surface shape and dielectric behavior at the frequency of the radar signal. In certain embodiments, only direct reflections contribute to a detectable receive signal since off-direction scattered signals can be too weak to be received by at the radar receiver. The illuminated areas of the target with normal vectors pointing back at the receiver can act as transmit antenna apertures with directives (gains) in accordance with their effective aperture areas. Equation (2), below, describes the reflective back power.

$$P_{refl} = p_t A_t G_t \sim p_t A_t r_t \frac{A_t}{\lambda^2/4\pi} = p_t RSC \quad (2)$$

In Equation (2), $P_{refl}$ describes the effective (isotropic) target-reflected power (W). The term, $A_t$, describes the effective target area normal to the radar direction (m$^2$). The term $r_t$ describes the reflectivity of the material and shape, which can range from [0, . . . , 1]. The term $G_t$ describes the corresponding aperture gain (dBi). RCS is the radar cross section (m$^2$) and is an equivalent area that scales proportional to the actual reflecting area-squared inversely proportional with the wavelength-squared and is reduced by various shape factors and the reflectivity of the material itself. For a flat, fully reflecting mirror of area $A_t$, large compared with $\lambda^2$, RCS=4 $\pi A_t^2/\lambda^2$. Due to the material and shape dependency, it is difficult to deduce the actual physical area of a target from the reflected power, even if the distance 310 to the target object 308 is known.

The target reflected power at the receiver location results from the reflected power density at the reverse distance 310 collected over the receiver antenna aperture area. Equation (3), below, describes the received target reflected power. It is noted that $P_R$ is the received target reflected power (W) and $A_R$ is the receiver antenna effective aperture area (m$^2$). In certain embodiments, $A_R$ is the same as $A_t$.

$$P_R = \frac{P_{refl}}{4\pi R^2} A_R = P_T \cdot RSC \frac{A_T A_R}{4\pi \lambda^2 R^4} \quad (3)$$

A radar system can be used as long as the receiver signal exhibits sufficient signal-to-noise ratio (SNR). The value of SNR depends on the waveform and detection method. Equation (4), below, describes the SNR. It is noted that kT is the Boltzmann constant multiplied by the current temperature. B is the radar signal bandwidth (Hz). F is the receiver noise factor which is a degradation of the receive signal SNR due to noise contributions of the receiver circuit itself.

$$SNR = \frac{P_R}{kT \cdot B \cdot F} \quad (4)$$

When the radar signal is a short pulse of duration or width, $T_p$, the delay or time difference 312 between the transmission and reception of the corresponding echo is described in Equation (5). τ corresponds to the delay between the transmission and reception of the corresponding echo and equal to Equation (5). c is the speed of light propagation in the air. When there are multiple targets at different distances, individual echoes can be distinguished only if the delays differ by at least one pulse width. As such, the range resolution of the radar is described in Equation (6). A rectangular pulse of a duration $T_P$ exhibits a power spectral density as described in Equation (7) and includes a first null at its bandwidth as shown in Equation (8). The range resolution of a radar signal is connected with the bandwidth of the radar waveform is expressed in Equation (9).

$$\tau = 2R/c \quad (5)$$

$$\Delta R = c\Delta\tau/2 = cT_P/2 \quad (6)$$

$$P(f) \sim (\sin(\pi f T_p)/(\pi f T_p))^2 \quad (7)$$

$$B = 1/T_P \quad (8)$$

$$\Delta R = c/2B \quad (9)$$

An electronic device such as a 5G terminal or UE can be equipped with multiple antenna elements. There can also be one or more antenna modules fitted on the terminal where each module can have one or more antenna elements. FIGS. 3B and 3C illustrate electronic devices 300a and 300b, respectively. The electronic devices 300a and 300b can be similar to any of the client devices 106-114 of FIG. 1, the electronic device 300 of FIG. 3A, and include internal components similar to the electronic device 200 of FIG. 2.

The electronic device 300a, as illustrated in FIG. 3B includes three transceivers 320a, 320b and 320c (collectively transceivers 320) for communication and three transceivers 322a, 322b and 322c (collectively transceivers 322) for radar. The transceiver 320 can be similar to the transceiver 210 of FIG. 2 and the transceiver 322 can be similar to the radar transceiver 270 of FIG. 2.

Similarly, the electronic device 300b, as illustrated in FIG. 3C includes three transceivers 324a, 324b and 324c (collectively transceivers 324). The transceivers 324 include a communication module with collocated radar. In other embodiments (such as illustrated in FIG. 3B) the communication module is not collocated with radar. The transceiver 324 can be similar to the transceiver 210 and the radar transceiver 270 of FIG. 2.

It is noted that the number of transceivers, the location of the transceivers, and the size of the transceivers, of the electronic devices 300a and 300b can vary.

FIG. 3D illustrates an example power spectrum allocation graph 330 according to embodiments of this disclosure. The power spectrum allocation graph 330 illustrates radar signals 332 and communication signals 334 operating at different frequencies and power. As illustrated, radar signals 332 use less power than the communication signals 334. Additionally, the radar signals 332 use a different frequency than the communication signals 334, thereby enabling simultaneous operation. However, due to resource limitations, such as power by the battery 275 of FIG. 2, the electronic device may have inadequate power to provide enough power to support both the radar signals 332 (for performing a high demanding radar application) and the communication signals 334 (for performing high throughput). As such, the electronic device allocates power to the radar signals 332 and the communication signals 334 based on a determination of which one of the signals is prioritized.

Although FIGS. 3A, 3B, and 3C illustrates the electronic devices 300, 300a, and 300b, respectively, various changes can be made to FIGS. 3A-3C. For example, different antenna configurations can be provided on the electronic devices. Additionally, although FIG. 3D illustrates an example power spectrum allocation graph 330, various changes can be made to FIG. 3D. For example, the frequency of the radar signals 332 and the frequency of the communication signals 334 can vary. Similarly, the power of the radar signals 332 and the power of the communication signals 334 can vary. For instance, the frequency of the radar signals 332 and the frequency of the communication signals 334 may not be adjacent (abut) each other, such that a gap between the radar signals 332 and the communication signals 334 is present. Similarly, the power of the radar signals 332 can be, the same as or higher than the power of the communication signals 334. Additionally, the power of the radar signals 332 and the power of the communication signals 334 can vary at different frequencies. Accordingly, FIGS. 3A-3D do not limit this disclosure to any particular radar system or apparatus.

Figure 4A:
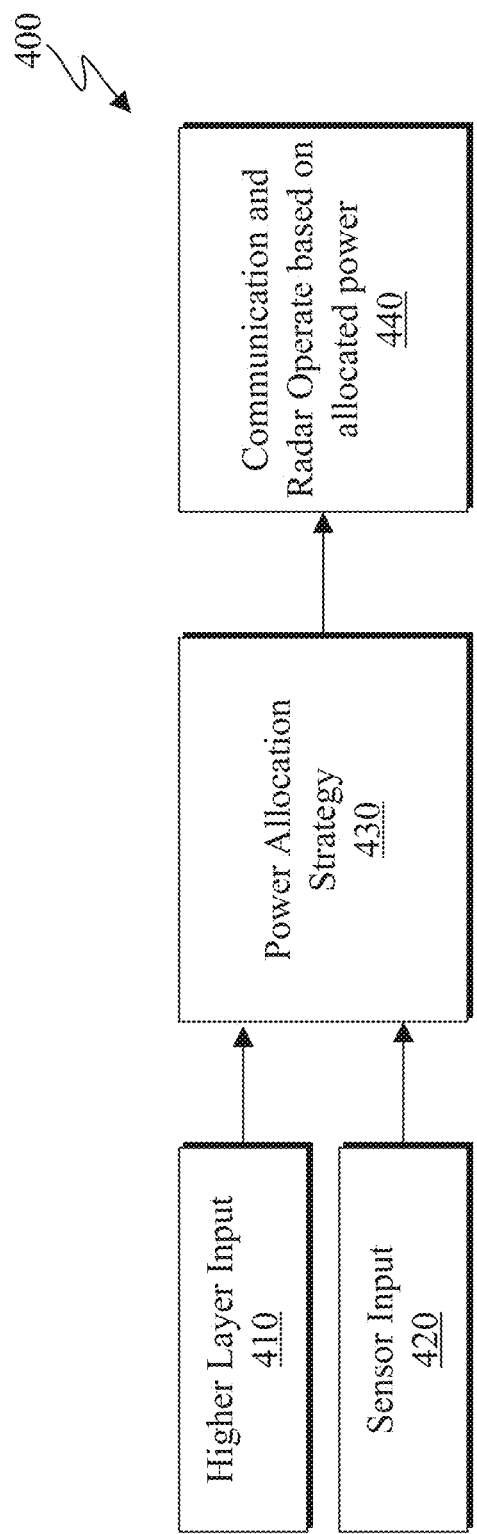
FIG. 4A illustrates an example signal processing diagram for allocating power for the communication and radar according to embodiments of this disclosure.
Figure 4B:
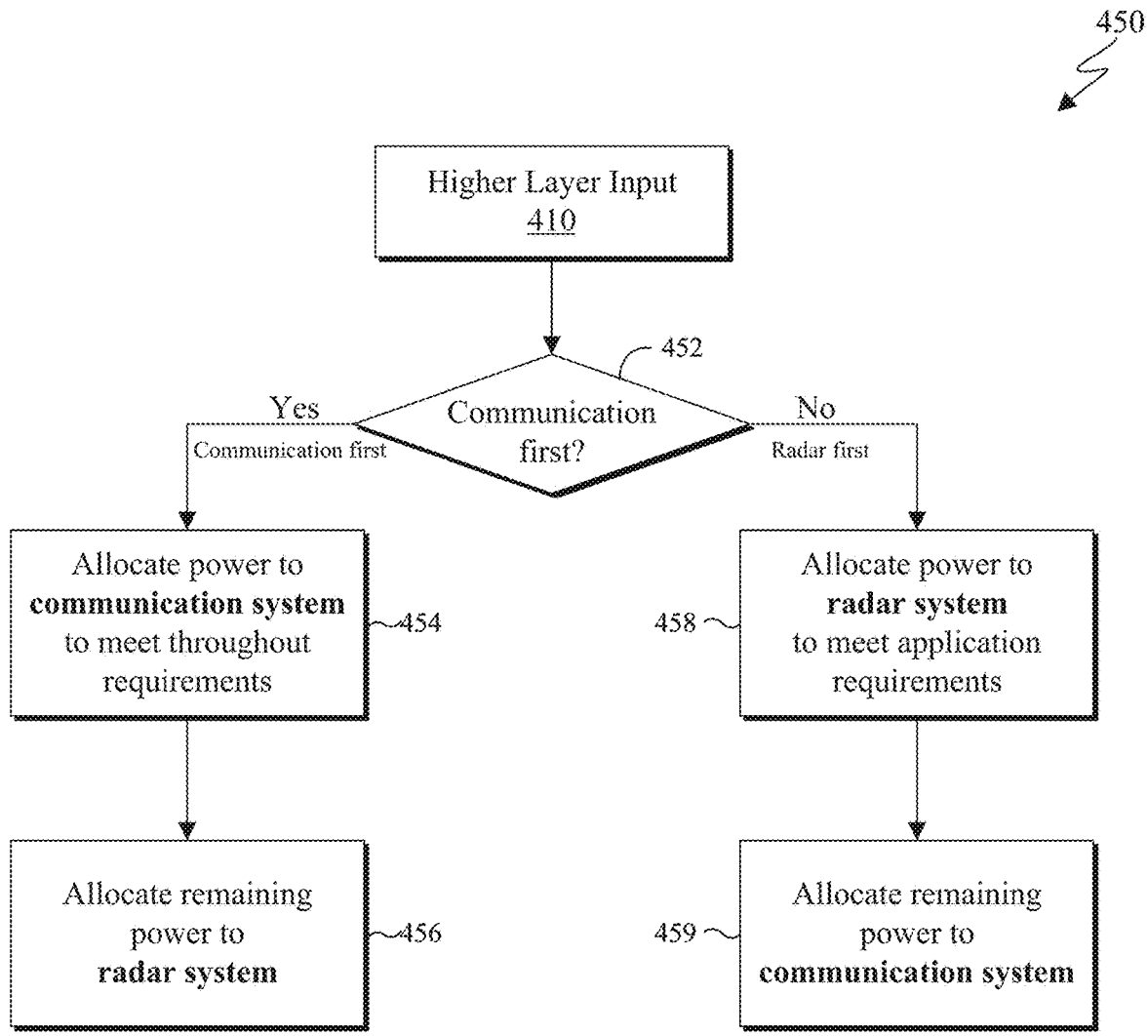
FIG. 4B illustrates a method for allocating power for the communication and radar according to embodiments of this disclosure.
Figure 4B:
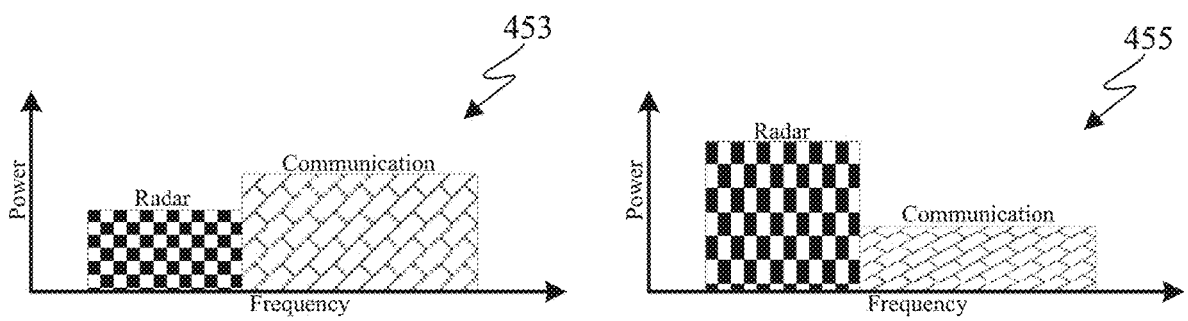
Figure 4C:
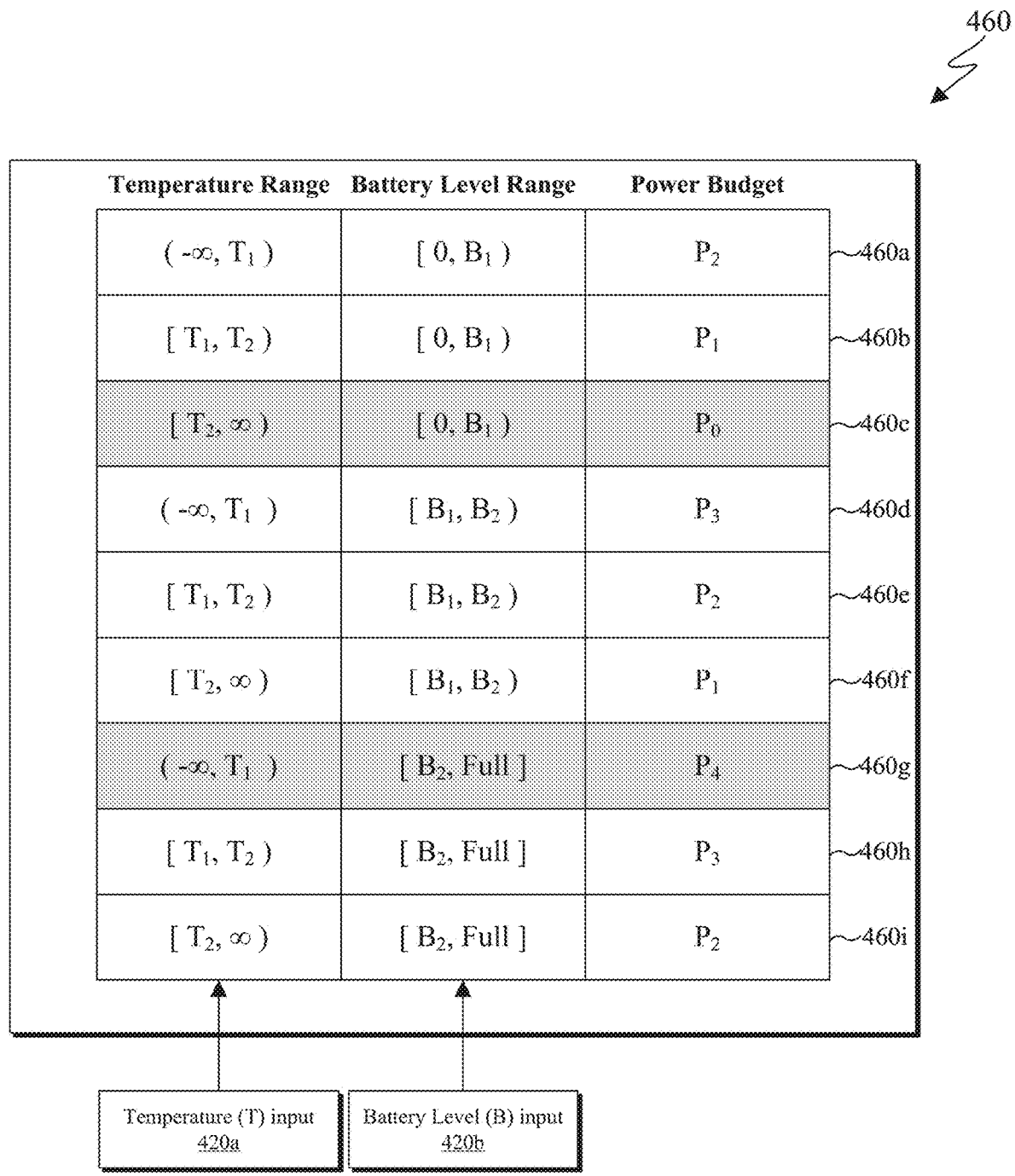
FIG. 4C illustrates an example power budget table according to embodiments of this disclosure.
Figures 4G, 4H:
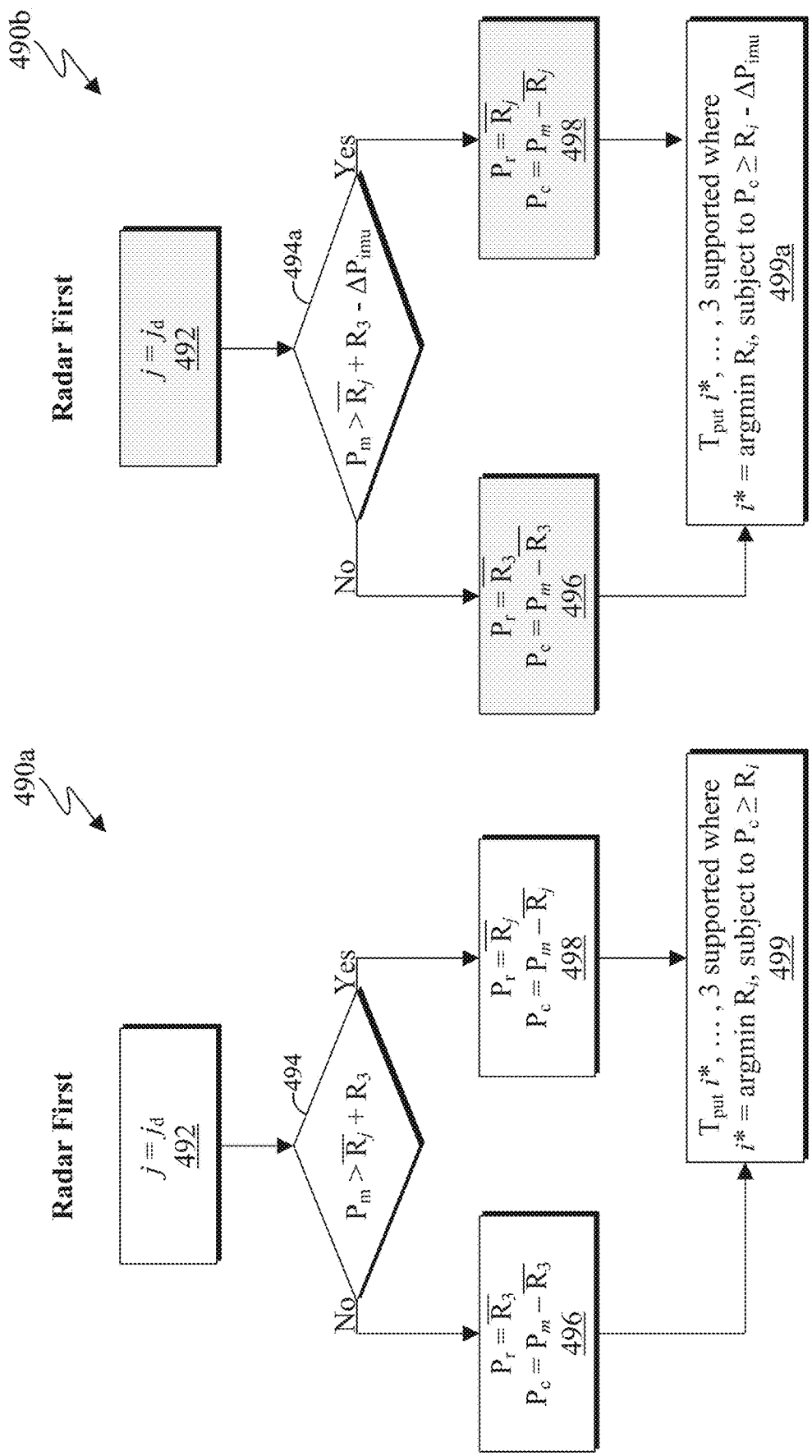
FIG. 4G illustrates an example method for allocating power when radar is prioritized according to embodiments of this disclosure.
FIG. 4H illustrates an example method for allocating power based on motion when radar is prioritized according to embodiments of this disclosure.

FIG. 4A illustrates an example signal processing diagram 400 for allocating power for the communication and radar according to embodiments of this disclosure. FIG. 4B illustrates a method 450 for allocating power for the communication and radar according to embodiments of this disclosure. FIG. 4C illustrates an example power budget table 460 according to embodiments of this disclosure. FIG. 4D illustrates example power usage tables 470 for radar and communication according to embodiments of this disclosure. FIG. 4E illustrates an example method 480a for allocating power when communication is prioritized according to embodiments of this disclosure. FIG. 4F illustrates an example method 480b for allocating power based on motion when communication is prioritized according to embodiments of this disclosure. FIG. 4G illustrates an example method 490a for allocating power when radar is prioritized according to embodiments of this disclosure. FIG. 4H illustrates an example method 490b for allocating power based on motion when radar is prioritized according to embodiments of this disclosure.

The signal processing diagram 400, as illustrated in FIG. 4A, the method 450, as illustrated in FIG. 4B, the methods 480a, 480b, 490a, and 490b, as illustrated in FIGS. 4E, 4F, 4G, and 4H, respectively, are described as implemented by any one of the client device 106-114 of FIG. 1, the electronic device 300 of FIG. 3A, the electronic device 300a of FIG. 3B and the electronic device 300b of FIG. 3C, and can include internal components similar to that of electronic device 200 of FIG. 2. However, the signal processing diagram 400 and the methods 450, 480a, 480b, 490a, and 490b, as shown in FIGS. 4A, 4B, 4E, 4F, 4G, and 4H, respectively, could be used with any other suitable electronic device and in any suitable system, such as when performed by the electronic device 200. The embodiments illustrated in the FIGS. 4A-4H are for illustration only. Other embodiments can be used without departing from the scope of the present disclosure.

The signal processing diagram 400, as illustrated in FIG. 4A describes an example for allocating power for the communication and radar. The signal processing diagram 400 describes determining a trade-off of power between the communication and radar systems based on using various inputs.

The electronic device generates a power allocation strategy (step 430) based on an obtained input from higher layers (step 410) and an obtained input from sensors (step 420).

In step 410 the electronic device 200, using the input from high layers, decides whether the current operation should be communication first (implying the communication system is given preference in power allocation), or radar first (implying the radar system is given preference in power allocation). Based on the input from the layer layers, a communication first and radar first assignment is determined, as illustrated in FIG. 4B. The types of input from higher layers and a discussion of what is meant by "higher layers" are provided in greater detail below, such as in FIG. 4B.

In certain embodiments, the inputs from sensors (step 420), such as a temperature and a battery level, can be used to determine the power budget. The electronic device 200 can use the input from sensors (step 420) as an aid to achieve an appropriate tradeoff between the communication and radar functionalities (as determined in step 430). Based on the information from the sensors, a table (such as the table 460 of FIG. 4C) can be used for determining the power budget. In certain embodiments, orientation information from a sensor (such as an IMU) is also obtained in step 420.

The strategies to achieve different tradeoffs based on different onboard sensors are discussed in detail in the embodiments in this disclosure. For example, the temperature of the electronic device can be used to determine the power budget. In this example, the higher temperature can imply a lower power budget to keep the electronic device from heating, whereas a lower temperature can imply higher power budget. Based on the inputs from the temperature sensors, the current power budget can be determined.

In certain embodiments, the electronic device 200 operates communication and radar simultaneously. For example, separate spectrum can be allocated for communication and radar functionality, as illustrated in FIG. 3C. In this case, the power consumed at any given time is shared between radar and communication functionality. Based on the power budget determined based on the inputs from the temperature sensors (such as step 420), the power is allocated to the radar and communication functionality by the power allocation block.

In the signal processing diagram 400, the resource allocation strategy of step 430 allocates the power depending on (i) the sensor input and (ii) the allocation preference (e.g., communication first or radar first), where the allocation preference can be indicated by the high layer. A power budget determination is part of the resource allocation strategy of step 430. The power budget determination helps achieving a better tradeoff between radar and communication functionality. FIGS. 4C, 4D, 4E, 4F, 4G, and 4H describe the power allocation strategy of step 430 in greater detail below.

For example, if the temperature of the electronic device 200 is not considered to lower the power budget, it is possible that eventually both the radar and communication functionality will need to be turned-off. With an appropriate power budget determination, it is possible that at a given time only one of the two functionalities (radar or communication) is supported. However, this indicates that the electronic device 200 can support one of the functionalities for a longer period of time. That is, if the communication only functionality is supported, then the lack of radar functionality is traded off for a longer duration of communication functionality and vice versa.

In step 440, the communication and/or radar operation ensues with the allocated power.

The method 450, as illustrated in FIG. 4B, describes an example power allocation based on a communication first or radar first determination. Generally, if the power allocation is communication first, then first the power is first allocated to the communication system to meet the throughput requirements, and the remaining power is assigned to the radar system. The implication of taking a communication first approach is that less power might be available for radar functionality, such that MPE or another radar-based application my not have the necessary power for operation. The input from sensors (step 420 of FIG. 4A and the tables 472 and 474 of FIG. 4D), can be used to overcome this limitation. Similarly, if the power allocation is radar first, then first the power is allocated to the radar system to support the desired application, and the remaining power is allocated to the communication system.

In step 410, the electronic device 200 obtains an input from higher layers. In step 452, the electronic device 200 determines whether the input from the higher layers indicates a communication first approach. In certain embodiments, the decision to take the communication first resource allocation (at step 454) or radar first resource allocation (at block 458), is based on pre-defined strategies. For example, the electronic device 200 can take a communication first approach by default. The rationale of this choice is that mobile device is primarily a communication device, and as such preference should be given to good quality communication. For another example, radar can be given preference when the user is using an application that expects a user to perform gestures or detect locations of objects within the environment around the electronic device 200. The user also can be given an option to override the default option of using communication first approach via phone settings. The electronic device can also receive an indication from an external source instructing the electronic device to use a communication first or radar first power allocation.

Upon a determination for communication-first (prioritizing communication over radar) (as determined in step 452), the electronic device 200 allocates power to the communication system to meet throughput requirements. In step 456, the electronic device 200 allocates any remaining power to the radar system. This is illustrated in the graph 453. The graph 453 illustrates using higher power for communication as compared to radar.

Upon a determination for radar-first (prioritizing radar over communication) (as determined in step 452), the electronic device 200 allocates power to the radar system to meet the application requirements. As described above, radar is used for various applications, such as MPE management, gesture detection, room sensing, and the like. In this example, an MPE detection application can uses the least amount of power for operating the radar, while the room sensing application uses the highest amount of power for operating the radar. As such, the amount of power that is allocated to the radar system is based on the application. In step 459, the electronic device 200 allocates any remaining power to the communication system. This is illustrated in the graph 455. The graph 455 illustrates using higher power for radar as compared to communication.

The table 460, as illustrated in FIG. 4C describes one example power budget based on temperature and battery level. In certain embodiments, sensor inputs such as one or more temperature sensors and one or more battery sensors are used to determine the power budget (e.g., the total power budgeted for both the communication system and the radar system), as described in step 420 of FIG. 4A. A temperature sensor can provide the temperature input 420a and the battery sensor can provide the battery level input 420b. The temperature input 420a can be the temperature of the electronic device. For example, the temperature can be the temperature of the battery, the chipset, or the like. The battery level input 420b can be the amount of electrical power remaining in the battery (such as the battery 275 of FIG. 2). The electronic device 200 can identify a power budget based on the temperature input 420a and the battery level input 420b.

FIG. 4C illustrates an example lookup table that can be used for determining the power budget based on the temperature input 420a and the battery level input 420b. In this example, the temperature, battery level, and power budget are quantized into finite set of values. Specifically, the electronic device temperature level (denoted as T) is separated into three different brackets by two values, $T_1$ and $T_2$, i.e., $(-\infty, T_1)$, $[T_1, T_2)$, $[T_2, \infty)$ Similarly, the electronic device battery level (denoted as B) is separated into three different brackets by two values, $B_1$ and $B_2$, i.e., $[0, B_1)$, $[B_1, B_2)$, $[B_2, \text{Full}]$, where the values $B_1$ and $B_2$ could be in percentages. For example, 0 corresponds to a fully depleted battery while full corresponds to a 100% full battery. In this example, $B_1$ could correspond to a 33% battery and $B_2$ could correspond to a 66% battery level. The power budget (e.g., expressed in dB) itself is separated into five distinct levels, i.e., $0 < P_0 < P_1 < P_2 < P_3 < P_4$. Note that, from procedural point of view there is no reason to limit to five power budgets. In this example, five levels of power budget suffice as there are three levels each for temperature and battery. It is noted that any other number of temperature levels, battery levels and power levels can be used. For example, a larger number of brackets for battery and temperature may result in a larger number of power levels. It is noted that temperature is inversely proportional to the power budget, and the battery level is directly proportional to the power budget.

The table 460 as illustrated in FIG. 4C illustrates one example mapping of the temperature values and battery levels to a number of power budgets. It is noted that the temperature ranges of FIG. 4C are in a normal operating range. Each row of the table (such as rows 460a, 460b, 460c, 460d, 460e, 460f, 460g, 460h, and 460i) relates a power budget $P_0$ through $P_4$ to a particular the temperature value range (from the temperature input 420a) to a certain battery level range (from the battery level input 420b).

As illustrated in the table 460, when the temperature is in the lowest bracket, and battery is in the highest bracket, the power level is the highest ($P_4$), since there is a large power budget provided by the low temperature and high battery level (as shown in row 460g). When the temperature is in the highest bracket and the battery level is in the lowest bracket, the power level is the lowest ($P_0$), since there is a very low power budget provided by the high temperature and low battery level (as shown in row 460c).

In certain embodiments, the table 460 can be simplified by using temperature only or battery level only for power budget determination, where the temperature will be inversely proportional to the power budget, and the battery level will be directly proportional to the power budget.

Once the power budget is determined, the power is allocated to the radar and communication functionalities (e.g., as described below). Note that determining the power budget helps in achieving a tradeoff between the instantaneous performance of the radar and communication functionalities and longer period of operation. For example, the electronic device can device would continue to support both radar and communication functionalities disregarding the temperature and battery levels. However, such operation will be short lived. This is because such operation will either drain the battery quickly, or the temperature of the electronic device will rise rapidly and eventually both functionalities will need to be turned off. If, however, one of the communication/radar functionalities operates in a power consumption level relative to the current battery and temperature levels, the electronic device 200 can support the other functionality for a longer period of time.

In certain embodiments, a non-sensor input can be used in step 420 of FIG. 4A for determining the power budget. The non-sensor input can be use in addition or instead of the temperature and battery sensors. A non-sensor input can be based on whether the electronic device 200 is operating in a power savings mode. The use of a power savings mode, initiated via an input by the user, and used for determining the power budget for communication and radar operations.

After determining the power budget (based on the temperature input 420a and the battery level input 420b) the electronic device 200 determines the power allocation strategy (step 430a of FIG. 4A). That is, the power allocation strategy is based on the power budget and whether communication is prioritized over radar, or the radar is prioritized over communication.

The communication and radar can operate at different power levels. For example, the operation requirement for the communication system is determined by the required throughput. The electronic device 200 can share the required throughput information to the higher layers. Here the higher layers are the higher layers of the open system interconnection (OSI) model above the physical layer. In certain embodiments, the throughput requirement is abstracted in three levels that of, high, medium, and low. It is noted that any number of levels can be used. Low data-rate could be for checking emails (without attachments) and could require data-rate only on the order of hundreds of kilobits per second (kbps). High data-rate could be for streaming high-quality videos or gaming and could require data-rate on the order of tens of mega-bytes per second (mbps). The table 472 of FIG. 4D describes the power requirements of three different throughput requirements (high, medium, and low).

For another example, the operation requirements for radar can be determined based on a particular radar-based application. Numerous radar applications can be used on an electronic device, where each application can use differencing power level for operation. Example, radar applications include MPE violation detection, gesture recognition, and room sensing. More or less applications can be used by an electronic device. MPE violation detection is the use of radar sensor to detect an object very close to radar (which can potentially be a human tissue) and then adjust the communication system parameters to ensure that MPE is below the limit. Gesture recognition is the process of detecting a gesture performed by a human as a mechanism to interact with the electronic device. Room sensing includes, but is not limited to, detecting the presence of living beings (e.g., pets and humans) in the room. Room sensing could also include mapping out position of different objects in the room, determining the layout of the room, and even detecting objects within the room. One prominent difference in these applications is in the coverage range requirement. The MPE violation detection requires the least range such as approximately 5 cm, gesture recognition has a range requirement of about 25 cm, and room sensing has range requirement from 1 m to 5 m. Typically, higher detection range implies higher transmission power requirement for the radar. The radar application that is operational at a given time is also communicated by the higher layers. The table 474 of FIG. 4D describes the power requirements of three different radar-based applications.

FIG. 4D illustrates the table 472 describing power usage for communication and the table 474 describing power usage for radar. That is, the table 472 describes power usage based on three different communication levels (high, medium, and low) and the table 474 describes power usage based on three different radar applications (room sensing, gesture recognition and MPE detection).

As illustrated in the table 472, indices $i \in \{1, 2, 3\}$ designate different throughput requirements and $R_i$ indicates the power required to support the throughput. For example, the power required to support the high throughout is described in row 472a, while the power required to support the low throughout is described in row 472c. The power required to support the medium throughout is described in row 472b. As illustrated, $R_3 < R_2 < R_1$.

Similarly, as illustrated in the table 474, indices j∈{1, 2, 3} designate different radar applications and $\overline{R}_j$ indicates the power required to support the application. For example, the power required to support the room sensing radar is described in row 474a, while the power required to support the MPE detection using radar is described in row 474c. The power required to support gesture recognition is described in row 474b. As illustrated, $R_3 < R_2 < R_1$.

It is noted that $P_0$ (from the table 460 of FIG. 4C) is the lowest power budget, $R_3$ (from the table 472 of FIG. 4D) is the power requirement for lowest throughput, and $\overline{R}_3$ (from the table 474 of FIG. 4D) is the power required for MPE detection application. It is noted that $P_0$ satisfies the condition of Equation (10), such that the lowest power budget will support the lowest throughput and the lowest radar application.

$$P_0 > R_3 + \overline{R}_3 \quad (10)$$

In certain embodiments, the electronic device 200 performs MPE detection via radar whenever communication is performed, regardless of the communication throughput. For example, it is possible that the power transmission level for low throughput requirement is such that it will not violate any MPE limits. IT is noted that the electronic device 200 can still perform MPE detection in this example.

In certain embodiments, other radar application (such as gesture recognition and room sensing) can be activated in addition to the MPE detection. For example, the activation of other two applications can happen such as in the following scenarios. For a first scenario, it is possible that the electronic device 200 is equipped with multiple radar modules, some used for the MPE detection and others used for the other two applications. For a second scenario, it is possible to have a set of radar parameters to support applications in addition to the MPE detection. Specifically, the radar parameters are selected to support multiple applications and digital processing of the radar data is done separately for multiple applications based on the same data. As MPE detection is the application with smallest range requirement, modifying the radar parameters to support other applications will typically imply increase in the radar power requirement.

The FIGS. 4E and 4F describe allocating power when communication is prioritized while FIGS. 4G and 4H describe allocating power when radar is prioritized. Additionally, the FIGS. 4F and 4H describe allocating power using additional inputs such as orientation information of the electronic device 200.

The method 480a of FIG. 4E illustrates an example communication first power allocation. In step 482, an electronic device (such as the electronic device 200) obtains an input of the desired level of throughput. The input is the throughput index $i_d$. In step 484, the electronic device 200 determines whether the decided power budget $P_m$, m∈{0, 1, 2, 3, 4}, is greater than the power required to support the desired throughput ($R_i$) and a radar application ($\overline{R}_3$) for MPE detection (the application that uses the least amount of power).

If the power budget can support the power associated with the desired throughput and the power associated with the lowest radar application (such as MPE detection) as determined in step 484, then the electronic device 200 in step 488 allocates power to the communication system. Once the power is allocated to the communication system, the remaining power is allocated to the radar system.

Alternatively, if the power budget cannot support the power associated with the desired throughput ($R_i$) and the power associated with the lowest radar application ($\overline{R}_3$) (such as MPE detection) as determined in step 484, then the electronic device 200 in step 486 selects a lower throughout level. Steps 484, 486, and 488 can be repeated until power is allocated for communication and radar. For example, the electronic device 200 determines whether lower level of throughput can be supported (step 484). For example, if the power budget can support the power associated with the lower throughput level and the power associated with the lowest radar application (such as MPE detection) as determined in step 484, then the electronic device 200 in step 488 allocates power to the communication system, and any remaining power of the power budget is provided to radar. If the power budget cannot support the power associated with the lower throughput and the power associated with the lowest radar application (such as MPE detection) as determined in step 484, then the electronic device 200 in step 486 selects an even lower throughout level and the process repeats until power is allocated to both radar and communication.

In step 489, the electronic device 200 determines which radar applications can be supported based on the allocated radar power $P_r$ and the power required by the radar applications. For example, based on the allocation, if enough power is allocated to radar, gesture detection or room sensing can be activated in addition to the MPE detection.

In certain embodiments, orientation information from an IMU sensor can be used improve the power allocation, such as by reducing the power needed for communication. An IMU can be a combination of accelerometers, gyroscopes and/or magnetometer to measure and report orientation and angular rate of the body, among others. The configurations of an IMU can include an accelerometer, gyroscopes and/or magnetometer per axis for each of the three principal axes (pitch, roll, and yaw). It is noted that the rate of the measurement, which determines the time between two successive measurements from IMU can varies from device to device. The measurements from the sensors are subject to error, and the level of error in each principal axes may be different and varies from device to device.

Orientation information from an IMU can be used to improve the beam-management of the communication system. For example, orientation information can be fused with the information of signal quality on the beams. Information about the signal quality can include reference signal received power (RSRP) signal-to-interference-and-noise ratio (SINR) or signal-to-noise ratio (SNR) or reference signal received quality (RSRQ). Information fusion is based on combining the orientation information and information about the signal quality, using signal processing tools such as extended Kalman filter (EKF), particle filter (PF) etc., or data driven strategies like machine learning (ML).

The fusion of the orientation information with the signal quality (such as the RSRP information on the beams) results in selecting a better beam in less time, as compared to selecting a better beam with no orientation information. The better beam selection implies selecting a beam with a higher RSRP. The improvement in RSRP can be denoted as $\Delta P_{IMU}$. That is, $\Delta P_{IMU}$ represents the power saved in beam management by using orientation information. It is noted that this improvement includes the power lost in fetching the information from the IMU as well. This improvement in RSRP can then be used to achieve a better tradeoff between communication and radar power allocation.

The method 480b of FIG. 4F illustrates an example communication first power allocation when signal quality information is fused with orientation information. It is noted that the method 480b is similar to the method 480a of FIG. 4E.

In step 482, an electronic device (such as the electronic device 200) obtains an input of the desired level of throughput. The input is the throughput index $i_d$.

In step 484a, the electronic device 200 determines whether the decided power budget $P_m$, m ∈ {0,1,2,3,4}, is greater than the power required to support the desired throughput ($R_i$) and a radar application ($\overline{R_3}$) for MPE detection (the application that uses the least amount of power) less the power saved in beam management by using orientation information ($\Delta P_{IMU}$).

In the absence of orientation information, the power required to achieve throughput level i was $R_i$ (as described in FIG. 4E). Due to the improved beam-selection using orientation information, the power required to achieve the throughput level i is now $R_i - \Delta P_{IMU}$. This implies that there is additional power available for the radar operation. Depending on the numerical value of $\Delta P_{IMU}$, the power savings in communication by the use of orientation information can enable radar applications that were previously not supported with the given power budget $P_m$.

If the power budget can support the power associated with the desired throughput and the power associated with the lowest radar application (such as MPE detection) as determined in step 484a, then the electronic device 200 in step 488a allocates power to the communication system corresponding to the desired throughput less the power savings $\Delta P_{IMU}$. Once the power is allocated to the communication system, the remaining power is allocated to the radar system.

The method 490a of FIG. 4G illustrates an example radar first power allocation. In step 492, an electronic device (such as the electronic device 200) obtains an input of the desired application index $j_d$. In step 494, the electronic device 200 determines whether the decided power budget $P_m$, m ∈ {0,1,2,3,4}, is greater than the power required to support the desired radar application ($\overline{R_J}$) and a lowest communication throughput level ($R_3$).

If the power budget can support the power associated with the desired application the lowest communication throughput level as determined in step 494, then the electronic device 200 in step 498 allocates power to radar. Once the power is allocated to the radar, the remaining power is allocated to the communication. It is noted that more than power can be allocated than the lowest power throughput level.

Alternatively, if the power budget cannot support the power associated with the desired radar application ($\overline{R_J}$) and the power associated with the lowest communication throughput ($R_3$) as determined in step 494, then the electronic device 200 in step 496 allocates power to the radar to support the lowest radar application ($\overline{R_3}$) for MPE detection and allocates any remaining power for communication. For example, if the user of the electronic device wanted to use radar for room sensing (the highest power) and there was not enough power to support a radar room sensing application and a lowest communication throughput, it is unlikely the user will want to reduce the radar power in order to perform a gesture.

In step 499, the electronic device 200 determines which communication throughput level it can support based on the allocated radar power $P_r$ and the power required for different throughput levels.

The method 490b of FIG. 4H illustrates an example radar first power allocation when signal quality information is fused with orientation information. It is noted that the method 490b is similar to the method 480a of FIG. 4E.

In step 492, an electronic device (such as the electronic device 200) obtains an input of the desired application index $j_d$. In step 494a, the electronic device 200 determines whether the decided power budget $P_m$, m ∈ {0,1,2,3,4}, is greater than the power required to support the desired radar application ($\overline{R_J}$) and the lowest throughput level ($R_3$) less the power saved in beam management by using orientation information ($\Delta P_{IMU}$).

After the power is allocated to radar, the remaining power is allocated to the communication functionality (in step 496 or step 498). It is noted that now a smaller amount of power is required to support the throughput level i, i.e., $R_i - \Delta P_{IMU}$. As such, the supported throughput levels are determined based on comparison with $R_i - \Delta P_{IMU}$ instead of $R_i$ as described in FIG. 4G. Depending on the numerical value of $\Delta P_{IMU}$, the same total power budget $P_m$ may now be able to support a higher throughput level due to decreased power level requirement.

Although FIG. 4A illustrates the signal processing diagram 400, FIG. 4B illustrates the method 450, FIG. 4C illustrates the power budget table 460, FIG. 4D illustrates the power usage tables 470, FIG. 4E illustrates the method 480a, FIG. 4F illustrates the method 480b, FIG. 4G illustrates the method 490a, and FIG. 4H illustrates the method 490b, various changes may be made to FIGS. 4A-4H. For example, while the signal processing diagram 400 and the methods 480a, 480b, 490a, and 490b are shown as a series of steps, various steps could overlap, occur in parallel, occur in a different order, or occur multiple times. In another example, steps may be omitted or replaced by other steps. For another example, while the tables 460 and 470 include various parameters, the number of parameters can change, and the values of the parameters can change.

Figure 5:
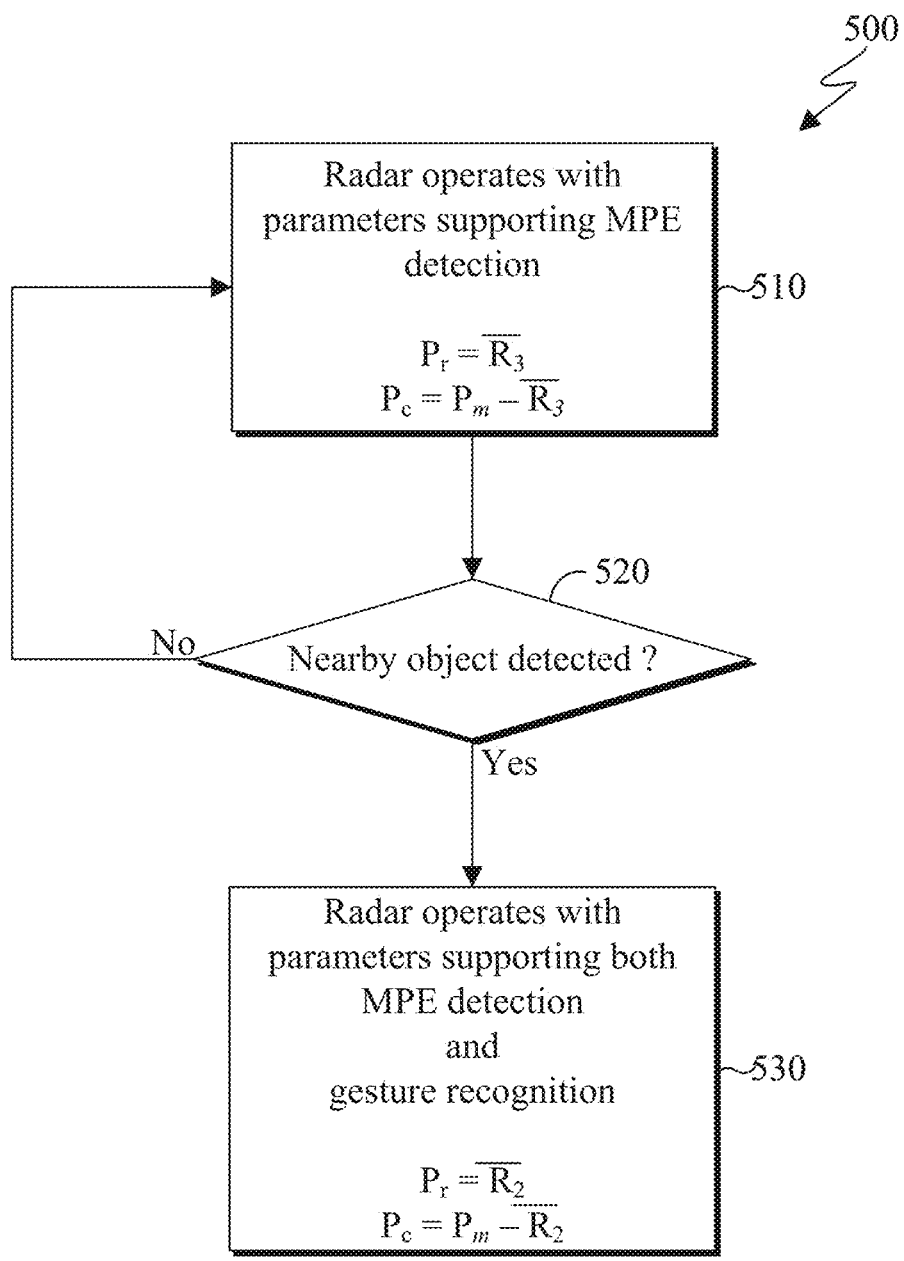
FIG. 5 illustrates an example method for allocating power when an object is detected according to embodiments of this disclosure.

FIG. 5 illustrates an example method 500 for allocating power when an object is detected according to embodiments of this disclosure. The embodiments of the method 500 of FIG. 5 is for illustration only. Other embodiments can be used without departing from the scope of the present disclosure.

The method 500 is described as implemented by any one of the client devices 106-114 of FIG. 1, the electronic device 300 of FIG. 3A, the electronic device 300a of FIG. 3B and the electronic device 300b of FIG. 3C and can include internal components similar to that of electronic device 200 of FIG. 2. However, the method 500 as shown in FIG. 5 could be used with any other suitable electronic device and in any suitable system, such as when performed by the electronic device 200. The embodiments of the method 500 of FIG. 5 are for illustration only. Other embodiments can be used without departing from the scope of the present disclosure.

Embodiments of the present disclosure take into consideration that gesture recognition is an application of radar, in which the radar continuously looks to detect a gesture. For example, the radar transmits continuously and detects whenever a gesture is performed. However, a gesture is a relatively rare event. As an example, even if 100 gestures are performed in a day, each lasting 2 seconds, the total time of the gestures is 200 seconds, which is 0.2% of the total time in the day. As such, the remaining 99.8% of the time the radar transmits even though no gesture is performed. Accordingly, using proximity detection and power allocation can reduce the allocated power for gesture recognition. For example, if an object is not in proximity to the electronic device, it is unlikely that a gesture for detection is being performed. As such, the power allocated to the radar can be reduced when no object is not in proximity to the electronic device. However, when an object is within a threshold distance to the electronic device, the power can be allocated to support gesture detection.

The method 500, as illustrated in FIG. 5 describes allocating power based on whether an object is detected within a threshold distance from the electronic device. In step 510, the electronic device 200 operates radar with parameters supporting a lowest radar application ($\overline{R_3}$), such as MPE detection. In step 520, the electronic device 200 determines whether an object is detected within a predefined distance from itself. When an object is detected within the predefined distance, the radar operates with parameters supporting both MPE ($\overline{R_3}$) and gesture detection ($\overline{R_2}$) and the power allocated for communication is reduced by the power needed to support gesture detection.

That is, the radar operates with the parameters that only enable the MPE detection mode (step 510). It is only after an object is detected within a nominal range (step 520) that the radar starts operation with the parameters that enable the gesture detection mode (step 530). As described above, the two choices of parameters differ in the power requirement, with the difference being $\overline{R_2}-\overline{R_3}$. When there is no object detected near the radar, an additional $\overline{R_2}-\overline{R_3}$ power is available for the communication system, which might enable a higher throughput level for a fixed power budget. This embodiment is suitable for the cases when the same radar modules are used for MPE detection and gesture recognition, albeit with different radar parameters. Using the same modules for multiple radar applications might be required due to cost and space considerations.

In certain embodiments, proximity detection is implemented using a dedicated hardware such as an infrared sensor. For example, dedicated hardware for proximity detection may be useful such as when separate radar modules are used for MPE detection and gesture detection. In this example, separate modules may be used because MPE detection modules are likely to be strategically placed close to the communication modules, and gesture detection modules are likely to be placed so that the radar field-of-view (FoV) covers the directions in which the user is likely to perform the gesture. In such situations, a dedicated proximity sensor may help keep the radar module dedicated for gesture recognition in sleep mode until an object is detected within a nominal distance, at which stage the radar module is activated. Radar being in the sleep mode implies larger power availability for the communication functionality.

Although FIG. 5 illustrates an example method 500, various changes may be made to FIG. 5. For example, while the method 500 is shown as a series of steps, various steps could overlap, occur in parallel, occur in a different order, or occur multiple times. In another example, steps may be omitted or replaced by other steps.

Figure 6:
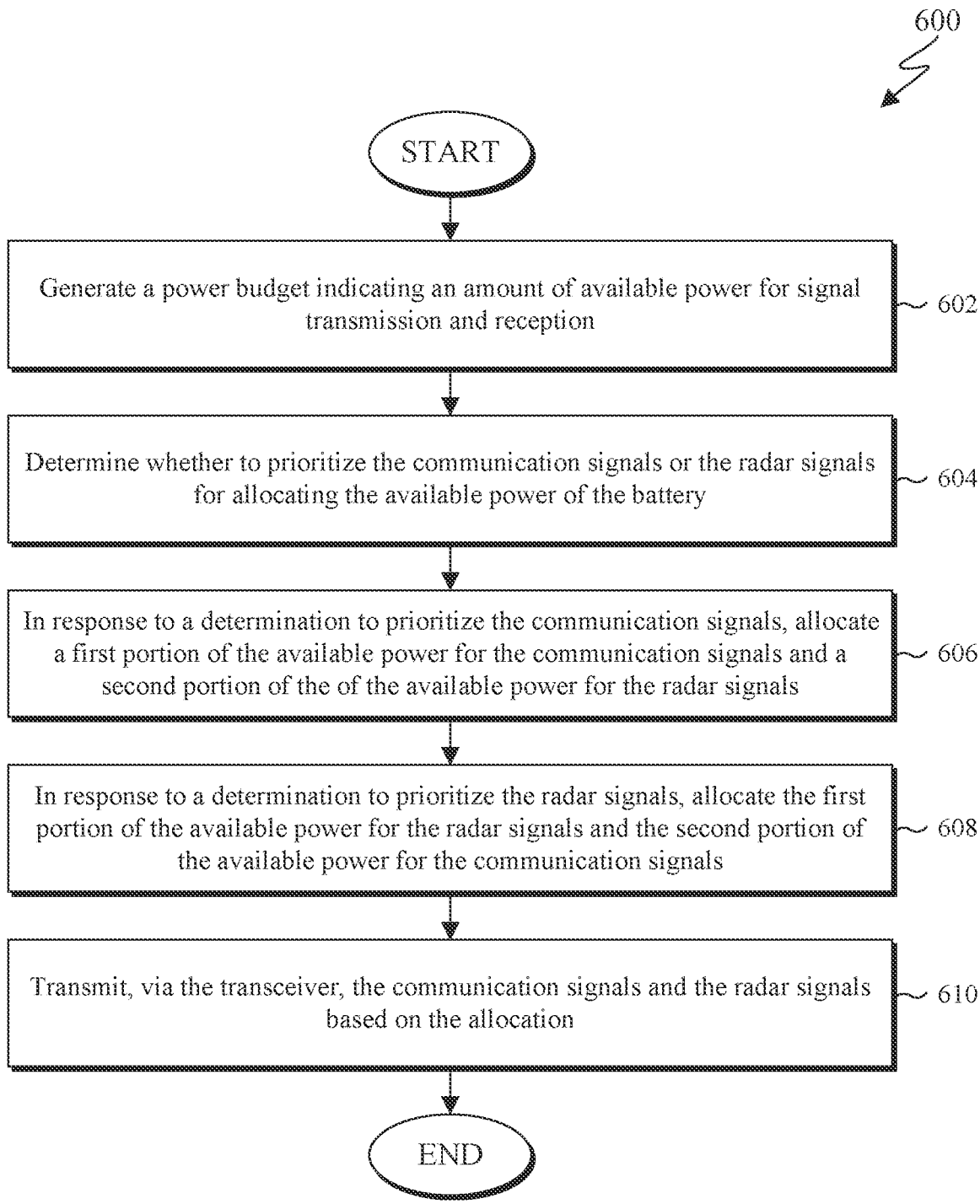
FIG. 6 illustrates an example method for power allocation according to embodiments of this disclosure.

FIG. 6 illustrates an example method 600 for power allocation according to embodiments of this disclosure. The embodiments of the method 600 of FIG. 6 is for illustration only. Other embodiments can be used without departing from the scope of the present disclosure.

The method 600 is described as implemented by any one of the client devices 106-114 of FIG. 1, the electronic device 300 of FIG. 3A, the electronic device 300a of FIG. 3B and the electronic device 300b of FIG. 3C and can include internal components similar to that of electronic device 200 of FIG. 2. However, the method 600 as shown in FIG. 6 could be used with any other suitable electronic device and in any suitable system, such as when performed by the electronic device 200. The embodiments of the method 600 of FIG. 6 are for illustration only. Other embodiments can be used without departing from the scope of the present disclosure.

In step 602, an electronic device (such as the electronic device 200) generates a power budget. The power budget indicates an amount of available power for signal transmission and reception. The signal transmission and reception can include signals for communication and radar.

In certain embodiments, the electronic device 200 includes a battery sensor for detecting a battery level. In certain embodiments, the electronic device 200 includes a temperature sensor for detecting the temperature of the electronic device 200. For example, the temperature sensor can detect the temperature of the battery. The temperature sensor can detect the temperature of the chipset, such as the transmitter. The electronic device can generate the power budget based on the battery level of the battery of the electronic device and the temperature of the electronic device. It is noted that the battery level is proportionally to the power budget. For example, the higher the battery level (the closer the battery level is to the full level), the larger the power budget is. In contrast, the temperature is inversely proportional to the power budget. For example, the higher the temperature, the smaller the power budget is.

In step 604, the electronic device 200 determines whether to prioritize the communication signals or the radar signals for allocating the available power of the battery. For example, based on an indication form a higher layer the electronic device can determine to prioritize the communication signals or the radar signals. The higher layers can be from a user input (such as selecting which signals to prioritize), another program that is activated on the electronic device (such as a program to perform room sensing), received from an external source, or the like.

The electronic device 200 can identify a communication throughout level from a plurality of communication throughput levels. In certain embodiments, there are three communication throughout levels, denoted as a high communication throughout level, a medium communication throughout level, and a low communication throughout level. In other embodiments, the electronic device 200 identifies more or less communication throughout levels.

The electronic device 200 can also identify a radar usage level from a plurality of radar usage levels. The radar usage level can be related to a particular application that is performing a radar-based application. A radar application can perform MPE operations. In an MPE operation, the electronic device 200 uses radar for detecting the presence of a human body part, via radar, and if needed, changing the beams, or reducing communication transmission power at locations where the human body part was detected. Another radar application can detect and identify a gesture. A gesture detection operation can use more power than MPE detection, since a gesture is usually performed further away from the electronic device than a body part is for MPE operation. Another radar application, denoted as room sensing, can detect the presence of objects in a room. In certain embodiments, room sensing detects the presence of living objects (humans, animals, and the like) in a room. In certain embodiments, room sensing maps out positions of different objects in a room. In certain embodiments, room sensing determines a layout of objects in a room. In certain embodiments, room sensing can detect objects within a room. It is noted that a room sensing operation can use more power than gesture detection, since the objects that are sensed within a room is usually further away from the electronic device than a body part is for gesture detection. In other embodiments, the electronic device 200 uses additional radar-based applications.

In certain embodiments, the electronic device 200 can allocate the available power based on the identified communication throughput level and the radar usage level.

In certain embodiments, the electronic device 200 can determine whether an object is detected within a threshold distance, while the radar signals are used for an MPE operation. When the object is detected within the threshold distance the electronic device 200 changes the radar usage level from the third level to the second level. The electronic device 200 can allocate a portion of the available power to support a higher radar usage operation (such as gesture detection) and any remaining portion of the available power is allocated to support the communication signals.

To allocate the available power based on a determination to prioritize communication signals, the electronic device, in step 606, allocates a first portion of the available power for the communication signals and a second portion of the of the available power for the radar signals. In certain embodiments, the electronic device 200 determines whether the available power is greater than a first power level corresponding to the identified communication throughput level and a second power level corresponding to a lowest radar usage level selected from the plurality of radar usage levels. The lowest radar usage level can be the MPE operation. In response to a determination that the available power is greater than the first power level and the second power level, the electronic device 200 sets (i) the first portion of the available power for the communication signals to the first power level and (ii) the second portion of the of the available power for the radar signals to the power budget less the first power level. Alternatively, in response to a determination that the available power is not greater than the first power level and the second power level, the electronic device 200 selects a lower communication throughput level. Thereafter, the electronic device 200 determines whether the available power is greater than a third power level corresponding to the lower communication throughput level and the second power level. In response to a determination that the available power is greater than the third power level and the second power level, the electronic device 200 sets (i) the first portion of the available power for the communication signals to the third power level and (ii) the second portion of the of the available power for the radar signals to the power budget less the third power level.

In certain embodiments, the electronic device 200 additionally uses its orientation information (such as information obtained by an IMU sensor) when allocating the power based on a determination to prioritize the communication signals over the radar signals. The electronic device 200 can identify a power savings for beam management based on the orientation of the electronic device. The electronic device 200 can also determine whether the available power is greater than the first power level, the second power level, and the power savings. In response to a determination that the available power is greater than the first power level, the second power level, and the power savings, the electronic device 200 sets (i) the first portion of the available power to the first power level less the power savings and (ii) the second portion of the of the available power to the power budget with the power savings less the first power level.

To allocate the available power based on a determination to prioritize radar signals, the electronic device, in step 608, allocates a first portion of the available power for the radar signals and a second portion of the of the available power for the communication signals. In certain embodiments, the electronic device 200 determines whether the available power is greater than a first power level corresponding to the radar usage level and a second power level corresponding to a lowest communication throughput level selected from the plurality of communication throughout levels. In response to a determination that the available power is greater than the first power level and the second power level, the electronic device 200 sets (i) the first portion of the available power for the radar signals to the first power level and (ii) the second portion of the of the available power for the communication signals to the power budget less the first power level. Alternatively, in response to a determination that the available power is not greater than the first power level and the second power level, the electronic device 200 sets (i) the first portion of the available power for the radar signals to a fifth power level corresponding to a lowest radar usage level selected from the plurality of radar usage levels and (ii) the second portion of the of the available power for the communication signals to the power budget less the fifth power level.

In certain embodiments, the electronic device 200 additionally uses its orientation information (such as information obtained by an IMU sensor) when allocating the power based on a determination to prioritize the radar signals over the communication signals. The electronic device 200 can identify a power savings for beam management based on the orientation of the electronic device. The electronic device 200 can determine whether the available power is greater than the first power level, the second power level, and the power savings. In response to a determination that the available power is greater than the first power level, the second power level, and the power savings, the electronic device 200 sets (i) the first portion of the available power for the radar signals to the first power level and (ii) the second portion of the of the available power for the communication signals to the power budget less the first power level. Alternatively, in response to a determination that the available power is not greater than the first power level, the second power level, and the power savings, the electronic device 200 sets (i) the first portion of the available power for the radar signals to the fifth power level and (ii) the second portion of the of the available power for the communication signals to the power budget less the fifth power level.

In step 610, the electronic device 200 transmits communication signals and radar signals based on the allocated power.

Although FIG. 6 illustrates an example method 600, various changes may be made to FIG. 6. For example, while the method 600 is shown as a series of steps, various steps could overlap, occur in parallel, occur in a different order, or occur multiple times. In another example, steps may be omitted or replaced by other steps.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system. None of the description in this application should be read as implying that any particular element, step, or function is an essential element that must be included in the claims scope.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a transceiver configured to transmit and receive radar signals and communication signals;
   a battery; and
   a processor operably connected to the transceiver, the processor configured to:
   generate a power budget indicating an amount of available power for signal transmission and reception,
   determine whether to prioritize the communication signals or the radar signals for allocating the available power of the battery,
   allocate the available power based on a communication throughput level and a radar usage level, including:
   in response to a determination to prioritize the communication signals, allocate a first portion of the available power for the communication signals and a second portion of the available power for the radar signals; and
   in response to a determination to prioritize the radar signals, allocate the first portion of the available power for the radar signals and the second portion of the available power for the communication signals, and
   transmit, via the transceiver, the communication signals and the radar signals based on the allocation.

2. The electronic device of claim 1, wherein:
   the electronic device further comprises:
   a battery sensor configured to detect a battery level of the battery, and
   a temperature sensor configured to detect a temperature of the battery; and
   to generate the power budget, the processor is configured to generate the power budget based on the battery level of the electronic device and the temperature.

3. The electronic device of claim 2, wherein the battery level is proportionally related to the power budget and the temperature is inversely proportionally related to the power budget.

4. The electronic device of claim 1, wherein the processor is further configured to:
   identify the communication throughput level from a plurality of communication throughout levels; and
   identify the radar usage level from a plurality of radar usage levels.

5. The electronic device of claim 4, wherein to allocate the available power based on the determination to prioritize the communication signals, the processor is configured to:
   determine whether the available power is greater than a first power level corresponding to the communication throughput level and a second power level corresponding to a lowest radar usage level selected from the plurality of radar usage levels;
   in response to a determination that the available power is greater than the first power level and the second power level, set (i) the first portion of the available power for the communication signals to the first power level and (ii) the second portion of the available power for the radar signals to the power budget less the first power level;
   in response to a determination that the available power is not greater than the first power level and the second power level, select a lower communication throughput level;
   determine whether the available power is greater than a third power level corresponding to the lower communication throughput level and the second power level; and
   in response to a determination that the available power is greater than the third power level and the second power level, set (i) the first portion of the available power for the communication signals to the third power level and (ii) the second portion of the available power for the radar signals to the power budget less the third power level.

6. The electronic device of claim 5, wherein:
   the electronic device further comprises an inertial measurement unit (IMU) sensor configured to detect an orientation of the electronic device; and
   the processor is further configured to:
   identify a power savings for beam management based on the orientation of the electronic device,
   determine whether the available power is greater than the first power level, the second power level, and the power savings, and
   in response to a determination that the available power is greater than the first power level, the second power level, and the power savings, set (i) the first portion of the available power to the first power level less the power savings and (ii) the second portion of the available power to the power budget with the power savings less the first power level.

7. The electronic device of claim 4, wherein to allocate the available power based on the determination to prioritize the radar signals, the processor is configured to:
   determine whether the available power is greater than a first power level corresponding to the radar usage level and a second power level corresponding to a lowest communication throughput level selected from the plurality of communication throughout levels;
   in response to a determination that the available power is greater than the first power level and the second power level, set (i) the first portion of the available power for the radar signals to the first power level and (ii) the second portion of the available power for the communication signals to the power budget less the first power level; and
   in response to a determination that the available power is not greater than the first power level and the second power level, set (i) the first portion of the available power for the radar signals to a fifth power level corresponding to a lowest radar usage level selected from the plurality of radar usage levels and (ii) the second portion of the available power for the communication signals to the power budget less the fifth power level.

8. The electronic device of claim 7, wherein:
the electronic device further comprises an IMU sensor configured to detect an orientation of the electronic device; and
the processor is further configured to:
  identify a power savings for beam management based on the orientation of the electronic device,
  determine whether the available power is greater than the first power level, the second power level, and the power savings,
  in response to a determination that the available power is greater than the first power level, the second power level, and the power savings, set (i) the first portion of the available power for the radar signals to the first power level and (ii) the second portion of the available power for the communication signals to the power budget less the first power level, and
  in response to a determination that the available power is not greater than the first power level, the second power level, and the power savings, set (i) the first portion of the available power for the radar signals to the fifth power level and (ii) the second portion of the available power for the communication signals to the power budget less the fifth power level.

9. The electronic device of claim 4, wherein the plurality of radar usage levels include:
a first level for detecting one or more objects in a room;
a second level for detecting an input corresponding to a gesture; and
a third level for detecting maximum permissible energy (MPE) associated with the communication signals,
wherein the first level uses more of the available power than the second level and the second level uses more of the available power than the third level.

10. The electronic device of claim 9, wherein the processor is configured to:
determine that an object is detected within a threshold distance, while the radar signals use the third level;
change the radar usage level from the third level to the second level; and
allocate a portion of the available power to support the second level of the plurality of radar usage levels and any remaining portion of the available power to support the communication signals.

11. A method for allocating power of an electronic device, the method comprising:
generating a power budget indicating an amount of available power for signal transmission and reception;
determining whether to prioritize communication signals or radar signals for allocating the available power of a battery;
allocating the available power based on a communication throughput level and a radar usage level, including:
  in response to a determination to prioritize the communication signals, allocating a first portion of the available power for the communication signals and a second portion of the available power for the radar signals; and
  in response to a determination to prioritize the radar signals, allocating the first portion of the available power for the radar signals and the second portion of the available power for the communication signals; and
transmitting the communication signals and the radar signals based on the allocation.

12. The method of claim 11, wherein the method further comprises:
detecting a battery level of the battery, and
detecting a temperature of the electronic device; and
wherein generating the power budget, comprises generating the power budget based on the battery level of the electronic device and the temperature.

13. The method of claim 11, further comprising:
identifying the communication throughput level from a plurality of communication throughout levels; and
identifying the radar usage level from a plurality of radar usage levels.

14. The method of claim 13, wherein allocating the available power based on the determination to prioritize the communication signals, comprises:
determining whether the available power is greater than a first power level corresponding to the communication throughput level and a second power level corresponding to a lowest radar usage level selected from the plurality of radar usage levels;
in response to a determination that the available power is greater than the first power level and the second power level, setting (i) the first portion of the available power for the communication signals to the first power level and (ii) the second portion of the available power for the radar signals to the power budget less the first power level;
in response to a determination that the available power is not greater than the first power level and the second power level, selecting a lower communication throughput level;
determining whether the available power is greater than a third power level corresponding to the lower communication throughput level and the second power level; and
in response to a determination that the available power is greater than the third power level and the second power level, setting (i) the first portion of the available power for the communication signals to the third power level and (ii) the second portion of the available power for the radar signals to the power budget less the third power level.

15. The method of claim 14, further comprising:
detecting an orientation of the electronic device; and
identifying a power savings for beam management based on the orientation of the electronic device,
determining whether the available power is greater than the first power level, the second power level, and the power savings, and
in response to a determination that the available power is greater than the first power level, the second power level, and the power savings, setting (i) the first portion of the available power to the first power level less the power savings and (ii) the second portion of the available power to the power budget with the power savings less the first power level.

16. The method of claim 13, wherein allocating the available power based on the determination to prioritize the radar signals, comprises:
determining whether the available power is greater than a first power level corresponding to the radar usage level and a second power level corresponding to a lowest communication throughput level selected from the plurality of communication throughout levels;

in response to a determination that the available power is greater than the first power level and the second power level, setting (i) the first portion of the available power for the radar signals to the first power level and (ii) the second portion of the available power for the communication signals to the power budget less the first power level; and in response to a determination that the available power is not greater than the first power level and the second power level, setting (i) the first portion of the available power for the radar signals to a fifth power level corresponding to a lowest radar usage level selected from the plurality of radar usage levels and (ii) the second portion of the available power for the communication signals to the power budget less the fifth power level.

17. The method of claim 16, further comprising:

detecting an orientation of the electronic device; and identifying a power savings for beam management based on the orientation of the electronic device, determining whether the available power is greater than the first power level, the second power level, and the power savings, in response to a determination that the available power is greater than the first power level, the second power level, and the power savings, setting (i) the first portion of the available power for the radar signals to the first power level and (ii) the second portion of the available power for the communication signals to the power budget less the first power level, and in response to a determination that the available power is not greater than the first power level, the second power level, and the power savings, setting (i) the first portion of the available power for the radar signals to the fifth power level and (ii) the second portion of the available power for the communication signals to the power budget less the fifth power level.

18. The method of claim 13, wherein the plurality of radar usage levels include:

a first level for detecting one or more objects in a room;

a second level for detecting an input corresponding to a gesture; and a third level for detecting maximum permissible energy (MPE) associated with the communication signals, wherein the first level uses more of the available power than the second level and the second level uses more of the available power than the third level.

19. The method of claim 18, further comprising:

determining that an object is detected within a threshold distance, while the radar signals use the third level;

changing the radar usage level from the third level to the second level; and allocating a portion of the available power to support the second level of the plurality of radar usage levels and any remaining portion of the available power to support the communication signals.

20. A non-transitory computer-readable medium embodying a computer program, the computer program comprising computer readable program code that, when executed by a processor of an electronic device, causes the processor to:

generate a power budget indicating an amount of available power for signal transmission and reception;

determine whether to prioritize communication signals or radar signals for allocating the available power of a battery;

allocate the available power based on a communication throughput level and a radar usage level, including:

in response to a determination to prioritize the communication signals, allocate a first portion of the available power for the communication signals and a second portion of the available power for the radar signals; and in response to a determination to prioritize the radar signals, allocate the first portion of the available power for the radar signals and the second portion of the available power for the communication signals; and transmit the communication signals and the radar signals based on the allocation.

\* \* \* \* \*